(12) United States Patent
Ahmad

(10) Patent No.: US 9,369,080 B2
(45) Date of Patent: Jun. 14, 2016

(54) MOTOR CONTROLLER

(71) Applicant: Nidec Corporation, Kyoto (JP)

(72) Inventor: Ghaderi Ahmad, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 14/422,471

(22) PCT Filed: Dec. 3, 2013

(86) PCT No.: PCT/JP2013/007076
§ 371 (c)(1),
(2) Date: Feb. 19, 2015

(87) PCT Pub. No.: WO2014/087640
PCT Pub. Date: Jun. 12, 2014

(65) Prior Publication Data
US 2015/0180399 A1    Jun. 25, 2015

Related U.S. Application Data

(60) Provisional application No. 61/733,925, filed on Dec. 6, 2012.

(51) Int. Cl.
  *H02P 1/46*      (2006.01)
  *H02P 23/14*     (2006.01)
  *H02P 25/08*     (2016.01)
  *H02P 31/00*     (2006.01)

(52) U.S. Cl.
  CPC .............. *H02P 23/14* (2013.01); *H02P 25/088* (2013.01); *H02P 31/00* (2013.01)

(58) Field of Classification Search
  CPC ..... H02P 21/005; H02P 23/004; H02P 27/12; H02P 21/0042; H02P 21/0046; H02P 21/06; H02P 21/08; H02P 21/10; H02P 21/12; H02P 21/141; H02P 25/08

USPC ................. 318/400.07, 400.15, 701
  See application file for complete search history.

(56) References Cited

U.S. PATENT DOCUMENTS 5,703,457 A    12/1997  Davis
5,739,664 A *   4/1998  Deng .................... B60L 15/025
                                          318/599

(Continued)

FOREIGN PATENT DOCUMENTS

| EP | 2190113 A1 | 5/2010 |
| JP | 07-079588 A | 3/1995 |
| JP | 2011-135762 A | 7/2011 |

OTHER PUBLICATIONS

Official Communication issued in International Patent Application No. PCT/JP2013/007076, mailed on Mar. 11, 2014.

*Primary Examiner* — Eduardo Colon Santana
*Assistant Examiner* — Bickey Dhakal
(74) *Attorney, Agent, or Firm* — Keating & Bennett, LLP

(57) ABSTRACT

A motor controller of a switched reluctance motor includes an inverter, a torque and flux calculator configured to estimate or measure torque and flux generated in the switched reluctance motor as calculated torque flux, based on an output from the inverter and a rotor angle of the switched reluctance motor, a switching pattern selector configured to input a signal to the inverter to select one of a plurality of switching patterns based on comparison results of a reference torque and the calculated torque and a reference flux and the calculated flux, and a flux phase angle, and a reference flux calculator configured to compare a highest phase flux out of three phase fluxes obtained by the torque and flux calculator with a flux limit and to reduce the reference flux when the maximum phase flux is higher than the flux limit.

22 Claims, 39 Drawing Sheets

(56) References Cited

U.S. PATENT DOCUMENTS

| | | | |
|---|---|---|---|
| 9,252,697 B2* | 2/2016 | Ahmad | H02P 25/085 |
| 2002/0109474 A1* | 8/2002 | Kifuku | H02H 7/0833 |
| | | | 318/434 |
| 2009/0026988 A1 | 1/2009 | Tomigashi | |
| 2009/0027000 A1* | 1/2009 | Gallegos-Lopez | B60L 15/025 |
| | | | 318/722 |
| 2009/0284195 A1* | 11/2009 | Gallegos-Lopez | B60L 15/025 |
| | | | 318/400.02 |

* cited by examiner

MOTOR CONTROLLER

BACKGROUND OF THE INVENTION

1. Field of the Invention

The present invention relates to a motor controller and more specifically to a motor controller configured to control a switched reluctance motor.

2. Description of the Related Art

Switched reluctance motors have been mentioned recently because of their advantage of low manufacturing costs, and simple rugged structure. A switched reluctance motor (hereinafter, referred to as "SRM") has no rotor winding and no permanent magnet, and has excellent robustness at high speeds and a wide speed range. In an SRM, torque is generated by applying current to stator windings while inductance is changing. If current is applied when the inductance is increasing, positive torque is created, while if current is applied when inductance is decreasing, negative torque is created.

To control the SRM efficiently, individual algorithms are usually used in high, middle and low speeds. For example, in a low speed, a chopping mode control is used, where a discrete constant current is applied to each phase. In a high speed, another control which is called angle control is used. The switching pattern of this control is called "single-pulse mode" where a single pulse is applied to each cycle of inductance. In a middle speed, a mixed control of low and high speeds is used.

To achieve the required current pattern for an SRM, various special inverters are proposed. For example, Zeljko et al. ("A Novel Power Inverter for Switched Reluctance Motor Drives", Elec. Energ. Vol. 18, No. 3, December 2005, pp. 453-465) discloses a topology where four inverter legs are provided for a three-phase SRM supply. The fourth leg is utilized to connect a star point of a three-phase winding. Because of this topology, each phase can be controlled independently.

On the other hand, WO2011/65406 discloses a direct torque control (hereinafter, referred to as "DTC") system for an interior permanent magnet motor. In the DTC system, one of switching patterns for the inverter is selected in accordance with a torque, a reference torque, a flux, a reference flux, a phase angle, and so on. The reference flux is obtained by referring to a flux trajectory which shows a relationship between flux magnitude and phase angle. The DTC system, shown in WO2011/65406, varies the form of the flux trajectory between a circle and a polygon in accordance with torque, reference torque, motor speed and crossover speed.

Conventional inverters for SRM have special topologies; therefore, the inverters should have discrete components. Using discrete components in an inverter instead of a single module increases cost, weight, size, assembling time and complexity, and reduces the inverter reliability and its ruggedness. Besides, the inverters cannot be used for any other type of motors.

Furthermore, inverters for SRM need individual algorithms for high, middle and low speeds, which increase the complexity of the system and setting time.

In a motor controller for SRM disclosed in WO2013/105506, one of switching patterns is selected based on a comparison result of reference torque and estimated torque and a comparison result of reference flux and estimated flux and a flux phase angle and inputting it to an inverter. The reference flux is obtained from a flux trajectory and a rotor angle with changing the flux trajectory in accordance with the reference torque and rotating speed, the flux trajectory indicating a relationship between rotor angle and reference flux.

SUMMARY OF THE INVENTION

In a case where a switched reluctance motor is controlled under DTC, there is a possibility that torque ripple increases. In contrast, preferred embodiments of the present invention significantly reduce or prevent torque ripple with a simple configuration.

A motor controller, which is an aspect of a preferred embodiment of the present invention, configured to control a switched reluctance motor includes an inverter connected to a switched reluctance motor; a torque and flux calculator configured to estimate or measure torque and flux generated in the switched reluctance motor as calculated torque and calculated flux, based on an output from the inverter and a rotor angle of the switched reluctance motor; a switching pattern selector configured to input a signal to the inverter to select one of switching patterns based on a comparison result of a reference torque and the calculated torque, a comparison result of the reference flux and the calculated flux, and a flux phase angle; and a reference flux calculator configured to compare the highest phase flux out of three phase fluxes obtained by the torque and flux calculation with a flux limit and to reduce the reference flux when the highest phase flux is higher than the flux limit.

In a motor controller of another aspect of a preferred embodiment of the present invention, the reference flux calculator is configured to compare the highest phase current out of three phase currents outputted from the inverter with current limit and to reduce the reference flux when the highest phase current is higher than the current limit.

Various preferred embodiments of the present invention significantly reduce or prevent torque ripple with a simple configuration in a switched reluctance motor controlled under direct torque control.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS $\psi$ hereinafter referred to as "psi".
$\theta$ hereinafter referred to as "theta"
$\omega$ hereinafter referred to as "omega"
$\uparrow$ hereinafter referred to as "up-arrow"
$\downarrow$ hereinafter referred to as "down-arrow"
$\rightarrow$ hereinafter referred to as "right-arrow"

Figure 1:
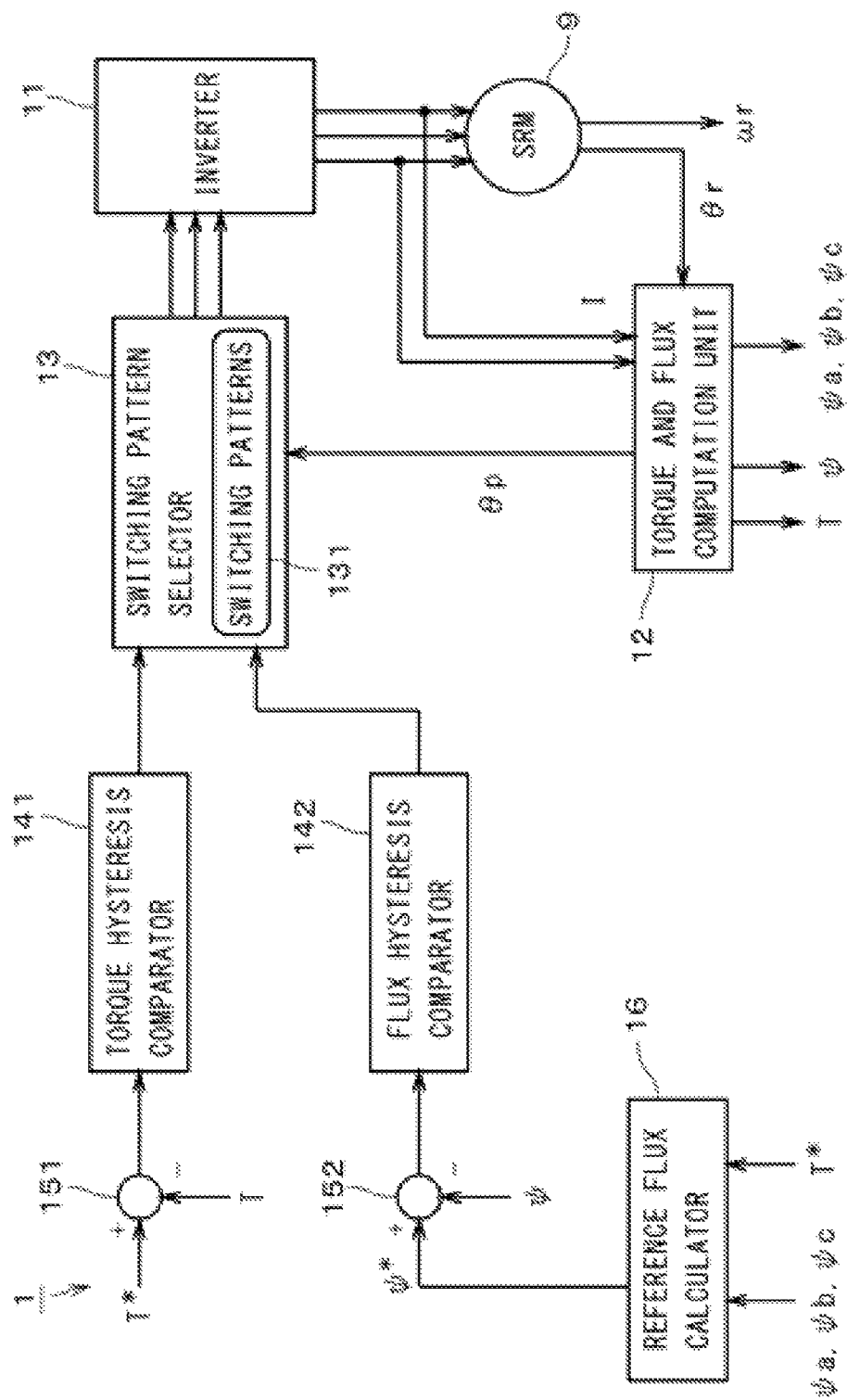
FIG. 1 is a block diagram showing a motor controller according to a preferred embodiment of the present invention.

FIG. 1 is a block diagram showing a motor controller 1. The motor controller 1 is configured to control an SRM (Switched Reluctance Motor) 9, preferably under DTC (Direct Torque Control).

Figure 2:
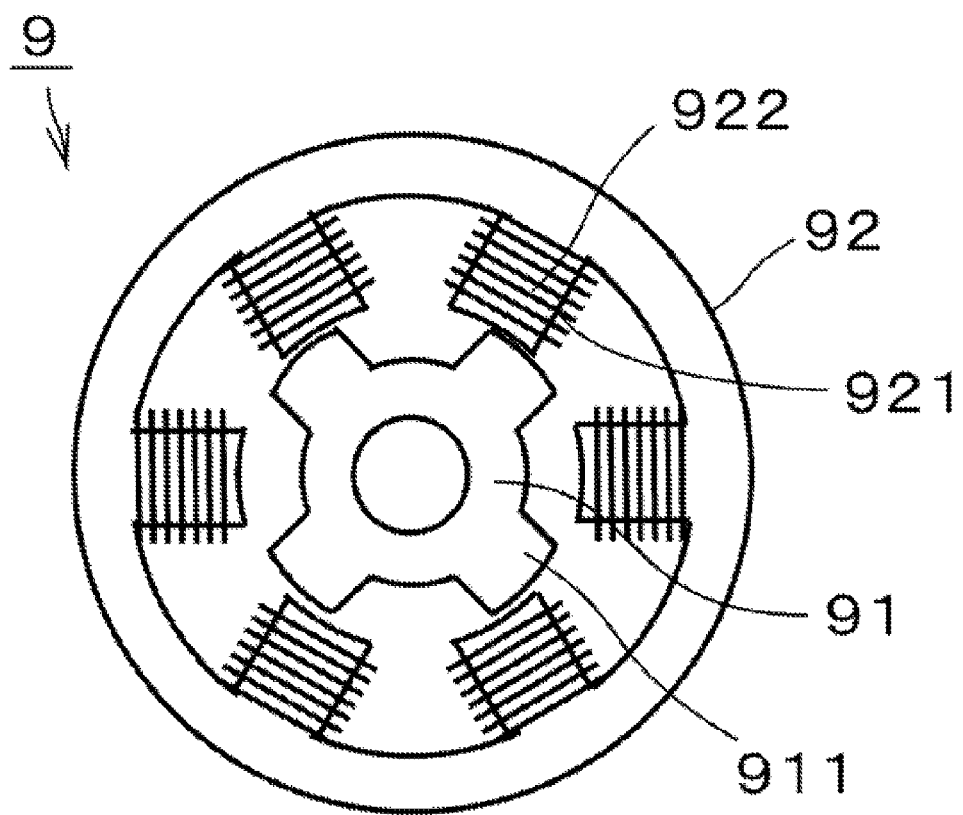
FIG. 2 is a schematic view of an SRM according to a preferred embodiment of the present invention.

FIG. 2 is a schematic view of the SRM 9. The SRM 9 preferably includes a rotor 91 and a stator 92. The rotor 91 is rotatably supported around the rotating axis by a bearing mechanism (not shown). The rotor 91 includes a plurality of portions 911 protruding toward the stator 92, and the stator 92 includes a plurality of portions 921 protruding toward the rotor 91, in other words, the SRM 9 preferably has double saliency. A wire is wound around each protruding portion 921 of the stator 92 to define a coil 922. The rotor 91 does not include a coil or a permanent magnet. Torque is produced by switching current supply pattern while inductance of each phase winding, i.e., coil(s) 922, is changing.

As shown in FIG. 1, the motor controller 1 preferably includes an inverter 11, a torque and flux calculator 12, a switching pattern selector 13, a torque hysteresis comparator 141, a flux hysteresis comparator 142, a torque subtractor 151, a flux subtractor 152, and a reference flux calculator 16. The torque and flux calculator 12 is configured to estimate or precisely obtain a calculated torque T and a calculated flux $\phi$ by computation. In other words, the torque and flux calculator 12 estimates or measures calculated torque T and calculated flux $\phi$.

The torque and flux calculator 12 also obtains phase fluxes $\phi a$, $\phi b$, $\phi c$ which are fluxes of three phases. Since a magnitude of calculated flux $\phi$ is a magnitude of sum of vectors which are phase fluxes $\phi a$, $\phi b$, $\phi c$ with considering their directions, calculating three phase fluxes $\phi a$, $\phi b$, $\phi c$ can be regarded as obtaining calculated flux $\phi$. The torque and flux calculator 12 is preferably configured to calculate three phase fluxes $\phi a$, $\phi b$, $\phi c$, and a conclusive magnitude of the calculated flux $\phi$ preferably is obtained at the constituent element which uses $\phi$.

The switching pattern selector 13 is configured to select a switching pattern to be applied to the inverter 11 out of switching patterns which are prepared in advance. The torque subtractor 151 is configured to obtain the difference between the calculated torque T and reference torque T* and input this difference to the torque hysteresis comparator 141. The torque hysteresis comparator 141 is configured to input the difference to the switching pattern selector 13 and to introduce hysteresis to the difference. The flux subtractor 152 is configured to obtain a difference between the calculated flux $\phi$ and reference flux $\phi$* and input the difference to the flux hysteresis comparator 142. The flux hysteresis comparator 142 is configured to input the difference to the switching pattern selector 13 and introduce hysteresis to the difference. The function of the reference flux calculator 16 will be discussed later.

Figure 3:
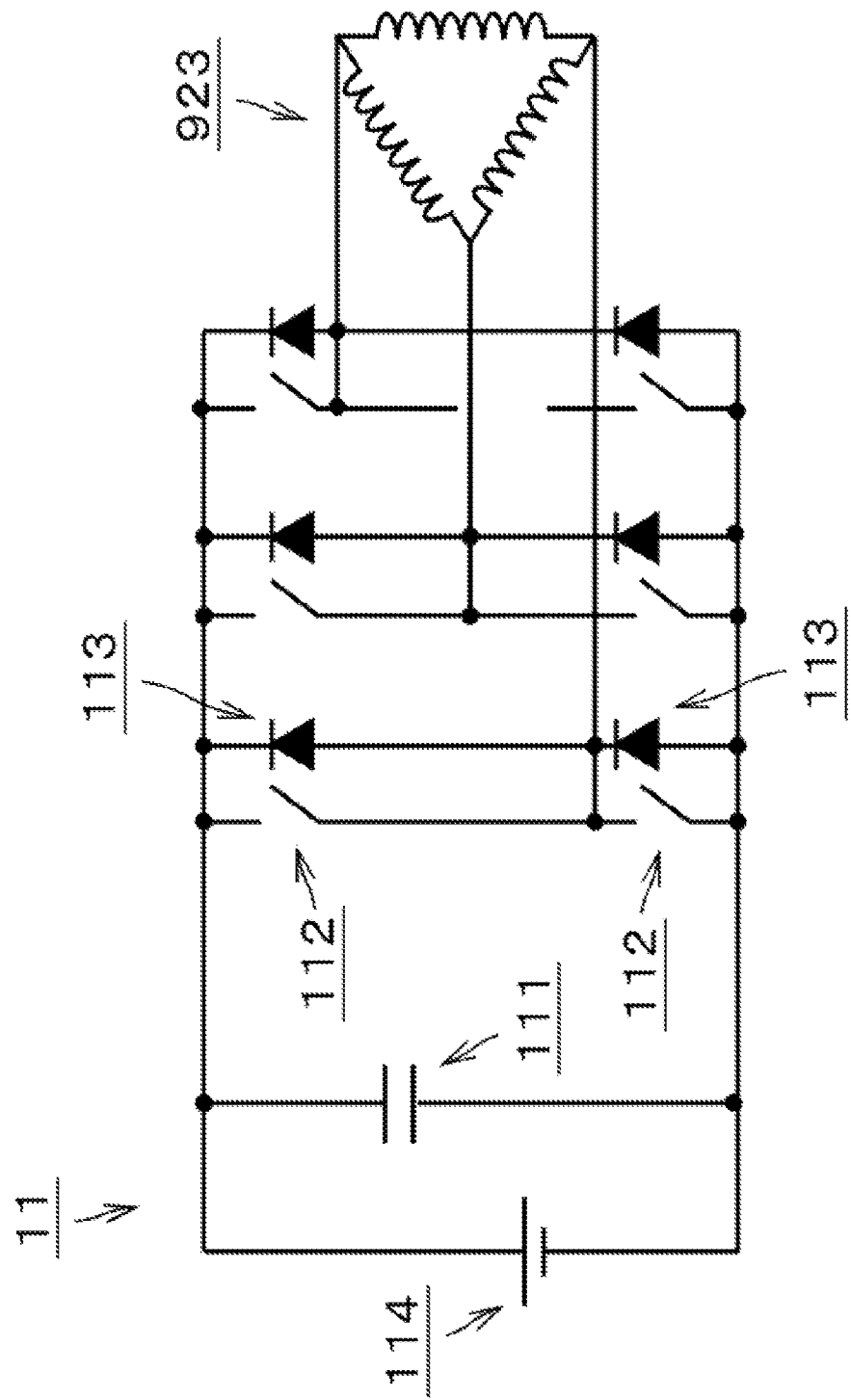
FIG. 3 shows an inverter according to a preferred embodiment of the present invention.

FIG. 3 shows the inverter 11 connected to SRM 9. The inverter 11 is preferably a general-purpose VSI (Voltage Source Inverter) which is a three-phase bridge inverter including 6 switching elements, for example. The inverter 11 preferably includes a capacitor 111, three pairs of switching elements 112 and three pairs of diodes 113, for example, which are connected in parallel to a DC supply 114. Each of three current supply lines is drawn from a point between elements of each pair of switching elements 112 and is connected to the SRM 9. The winding 923 of the SRM 9 is delta-connected. Current supplied from the inverter 11 is bipolar.

As shown in FIG. 1, rotor angle $\theta r$ and current I, which is output from the inverter 11, are inputted to the torque and flux calculator 12. The torque and flux calculator 12 is configured to estimate or measure torque produced by the SRM 9 and flux generated in the SRM 9 as calculated torque T and calculated flux $\phi$. The calculated torque T is inputted to the torque subtractor 151. The calculated flux $\phi$ is inputted to the flux subtractor 152.

The reference torque T* is also inputted to the torque subtractor 151. The torque subtractor 151 is configured to obtain a (signed) difference between the calculated torque T and the reference torque T* to input the difference to the torque hysteresis comparator 141. The reference torque T*, for example, is preferably calculated by a calculator (not shown) as torque which makes a rotating speed of the rotor 91 reach target speed. The reference flux φ* is also inputted to the flux subtractor 152. The flux subtractor 152 is configured to obtain a (signed) difference between the calculated flux φ and the reference flux φ* to input the difference to the flux hysteresis comparator 142. The reference flux φ* is calculated by the reference flux calculator 16.

The torque hysteresis comparator 141 is preferably a three-valued comparator. The torque hysteresis comparator 141 is configured to output "1" if the (signed) difference between the reference torque T* and the calculated torque T is larger than a predetermined positive threshold value, and to output "−1" if the difference is smaller than a predetermined negative threshold value. If the difference is between the positive threshold value and the negative threshold value, the torque hysteresis comparator 141 is configured to output "0". The flux hysteresis comparator 142 is preferably a binary comparator, for example. The flux hysteresis comparator 142 is configured to output "1" if the (signed) difference between the reference flux φ* and the calculated flux φ is larger than a predetermined positive threshold value, and to output "−1" if the difference is smaller than a predetermined negative threshold value. If the difference is between the positive threshold value and the negative threshold value, the flux hysteresis comparator 142 is configured to maintain an output of "1" or "−1" which is a former condition.

Values outputted from the torque hysteresis comparator 141 and the flux hysteresis comparator 142, in other words, a comparison result of the reference torque T* and the calculated torque T and a comparison result of the reference flux φ* and the calculated flux φ are inputted to the switching pattern selector 13. On the other hand, the torque and flux calculator 12 is configured to estimate or measure a flux phase angle θp by computation and to input the flux phase angle θp to the switching pattern selector 13. The switching pattern selector 13 is configured to select a switching pattern out of a plurality of switching patterns 131 based on these inputted values, and to input an signal indicating the selected pattern to the inverter 11.

Table 1 is used to select a switching pattern. "↑" in the column of torque T indicates the value inputted to the switching pattern selector 13 from the torque hysteresis selector 141 is "1". In other words, it indicates that a flux vector in the SRM 9 is rotated counterclockwise and a counterclockwise torque is increased. "↓" indicates the inputted value is "−1", the flux vector in the SRM 9 is rotated clockwise and the counterclockwise torque is decreased. "→" indicates the inputted value is "0", and the torque is maintained. Actually, the torque gradually decreases in accordance with gradual decrease of the flux.

TABLE 1

| T | ψ | n |
|---|---|---|
| ↑ | ↓ | K + 2 |
| ↑ | ↑ | K + 1 |
| → | — | 0 |
| ↓ | ↑ | K − 1 |
| ↓ | ↓ | K − 2 |

"↑" in the column of flux φ indicates the value inputted to the switching pattern selector 13 from the flux hysteresis selector 142 is "1". In other words, it indicates that flux generated in the SRM 9 is increased. "↓" indicates the inputted value is "−1" and the flux is decreased. "−" indicates ignoring the value inputted to the switching pattern selector 13 from the flux hysteresis comparator 142.

Figure 4:
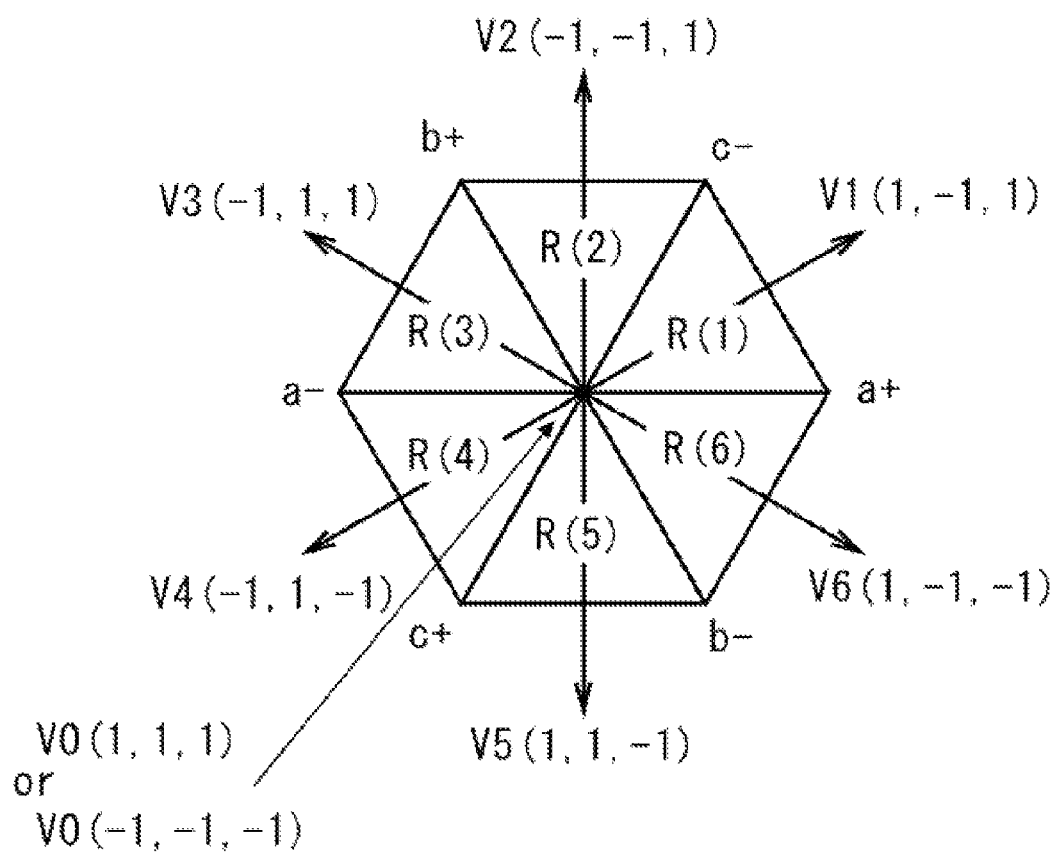
FIG. 4 shows a relationship between a flux phase angle and K according to a preferred embodiment of the present invention.

"n" shown in the Table 1 is the number of switching pattern to be set to the inverter 11. The n is determined by substituting a value indicating a range of the flux phase angle θp for K. FIG. 4 shows a relationship between the flux phase angle θp and K. A range R(1) shows a range of the flux phase angle θp where 1 is substituted for K. Similarly, R(2), R(3), . . . , R(6) show ranges where 2, 3, . . . , 6 are substituted for K, respectively. When (K+2) or (K+1) is more than 6, the value subtracted 6 from (K+2) or (K+1) is set to n. When (K−1) or (K−2) is less than 1, the value added 6 to (K+2) or (K+1) is set to n.

Figure 5:
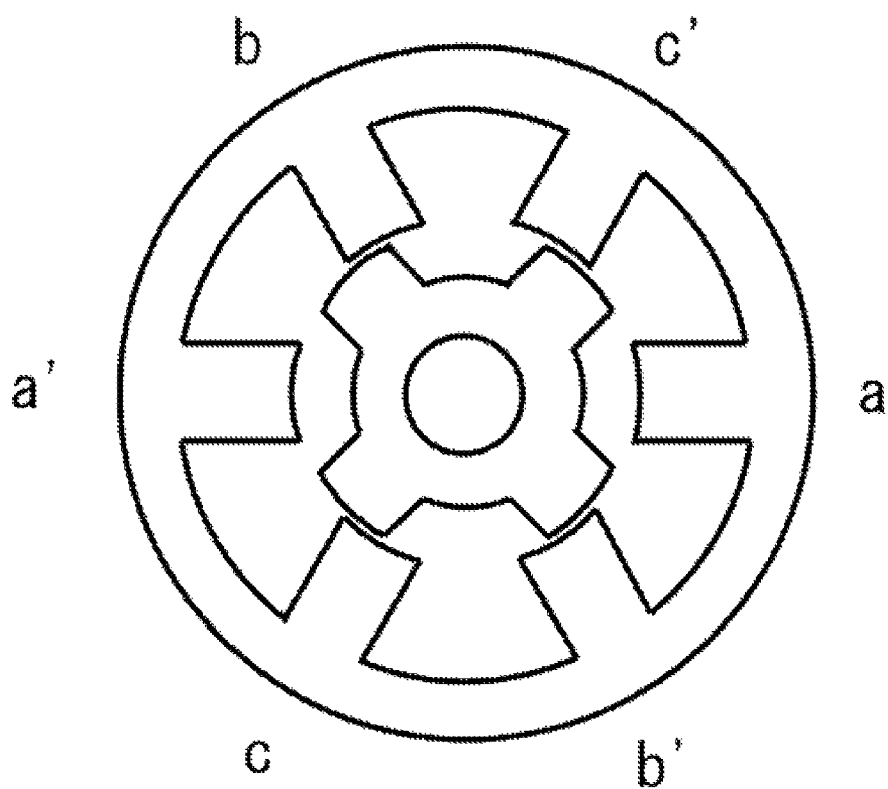
FIG. 5 shows locations of coils according to a preferred embodiment of the present invention.
Figure 6:
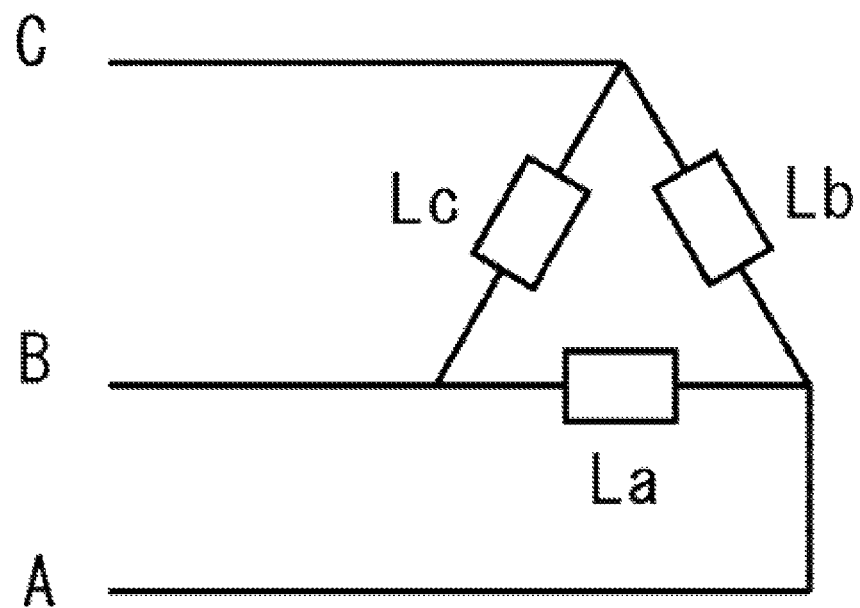
FIG. 6 shows a connection of coils according to a preferred embodiment of the present invention.

FIG. 5 shows preferred locations of coils 922 of each phase corresponding to flux directions a, b, c shown in FIG. 4. FIG. 6 is a schematic diagram showing connection of coils 922. Blocks with La, Lb, Lc represent coils of each phase, and FIG. 6 shows a connection relationship between coil groups La, Lb, Lc and wires A, B, C drawn from the inverter 11. A direction from a' to a in FIG. 5 corresponds to a direction from (a−) to (a+) in FIG. 4. A direction from b' to b corresponds to a direction from (b−) to (b+) in FIG. 4 and a direction from c' to c corresponds to a direction from (c−) to (c+) in FIG. 4. When current runs, in FIG. 6, in a clockwise direction in coil groups La, Lb, Lc which are delta connected, flux is generated in directions (a+), (b+), (c+) in FIG. 4, respectively.

After determining n by the switching pattern selector 13 based on the values inputted from the torque hysteresis comparator 141 and the flux hysteresis comparator 142, the flux phase angle θ p, and Table 1, a switching pattern for the inverter 11 is selected to realize a voltage vector Vn(A, B, C). Vn(A, B, C) is one of voltage vectors V1(1, −1, 1), V2(−1, −1, 1), . . . , V6(1, −1, −1) shown in FIG. 4. "1" or "−1" is set to each of A, B, C in accordance with the value n. "1" indicates applying a positive voltage to the wire A, B or C, and "−1" indicates applying a negative voltage to the wire A, B or C.

For example, if a value inputted from the torque hysteresis comparator 141 is "1", a value inputted from the flux hysteresis comparator 142 is "−1", and the flux phase angle θp is in the range R(1), then, "1" is substituted for K and n is set to (K+2), i.e., 3 with referring to the uppermost line of Table 1. Consequently, to make a voltage vector V3 (−1, 1, 1) shown in FIG. 6, a switching pattern is set to the inverter 11 to apply voltages which are negative, positive, positive, respectively, to the wires A, B, C shown in FIG. 5. Since the flux vector is represented by integration of voltage vectors, the end point of the flux vector which is in the range R(1) moves in the direction of V3 of FIG. 4. As a result, torque increases and flux decreases.

For another example, if a value inputted from the torque hysteresis comparator 141 is "−1", a value inputted from the flux hysteresis comparator 142 is "1", and the flux phase angle θp is in the range R(3), then, "3" is substituted for K and n is set to (K−1), i.e., 2 with referring to the third line of Table 1. Consequently, to make a voltage vector V2(−1, −1, 1) in FIG. 6, a switching pattern is set to the inverter 11 to apply voltages which are negative, negative, positive, respectively, to the wires A, B, C shown in FIG. 5. The end point of the flux vector which is in the range R(3) moves in the direction of V2 of FIG. 4, and torque decreases and flux increases.

When a value inputted from the torque hysteresis comparator 141 is "0", 0 is set to n and V0(1,1,1) or V0(−1,−1,−1) is selected. As a result, a switching pattern is selected to apply a positive voltage or a negative voltage to all of the wires A, B, C.

As discussed above, torque and flux are controlled by selecting switching patterns of the inverter 11 by the switching pattern selector 13, the SRM 9 is controlled to make the calculated torque T and the calculated flux $\phi$ follow the reference torque T* and the reference flux $\phi$*.

Figure 7:
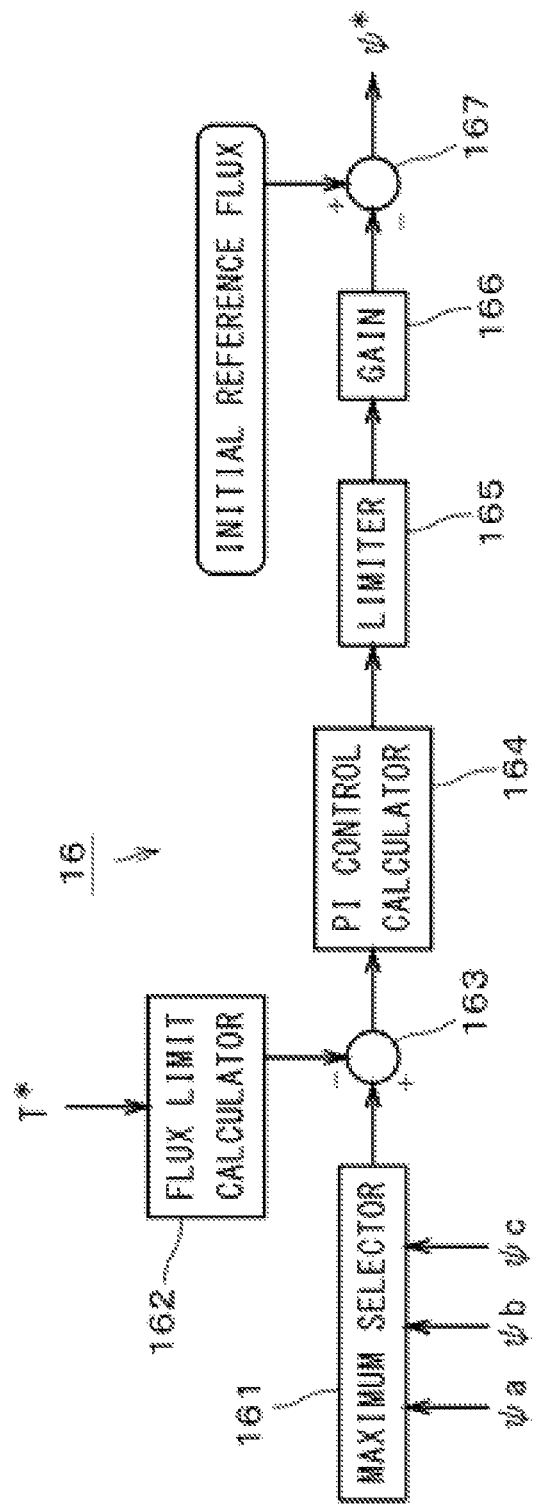
FIG. 7 shows a reference flux calculator according to a preferred embodiment of the present invention.

FIG. 7 shows the reference flux calculator 16. The reference flux calculator 16 includes a maximum selector 161, a flux limit calculator 162, a subtractor 163, a PI control calculator 164, a limiter 165, a gain operator 166 and a subtractor 167. Three phase fluxes $\phi a$, $\phi b$, $\phi c$ obtained by the torque and flux calculator 12 are inputted to the maximum selector 161. The maximum selector 161 is configured to select the maximum one out of three phase fluxes. The selected phase flux is inputted to the subtractor 163.

Reference torque T* is inputted to the flux limit calculator 162. The flux limit calculator 162 is configured to calculate a flux limit based on the reference torque T*. The flux limit corresponds or substantially corresponds to the maximum allowed flux. The flux limit is inputted to the subtractor 163. The subtractor 163 is configured to subtract the flux limit from the selected phase flux. The output from the subtractor 163 is inputted to the PI control calculator 164 and calculation of PI control is performed.

The output from the PI control calculator 164 is preferably inputted to the subtractor 167 through the limiter 165 and the gain operator 166. An initial reference flux is also inputted to the subtractor 167. The initial reference flux is a predetermined constant value. The subtractor 167 subtracts the output from the gain operator 166 from the initial reference flux to obtain reference flux $\phi$*. By performing the above-described control, the flux is controlled so that the maximum phase flux does not greatly exceed the flux limit. In other words, the reference flux calculator 16 is configured to compare the highest phase flux with the flux limit and to reduce the reference flux when the highest phase flux is higher than the flux limit.

Figure 8:
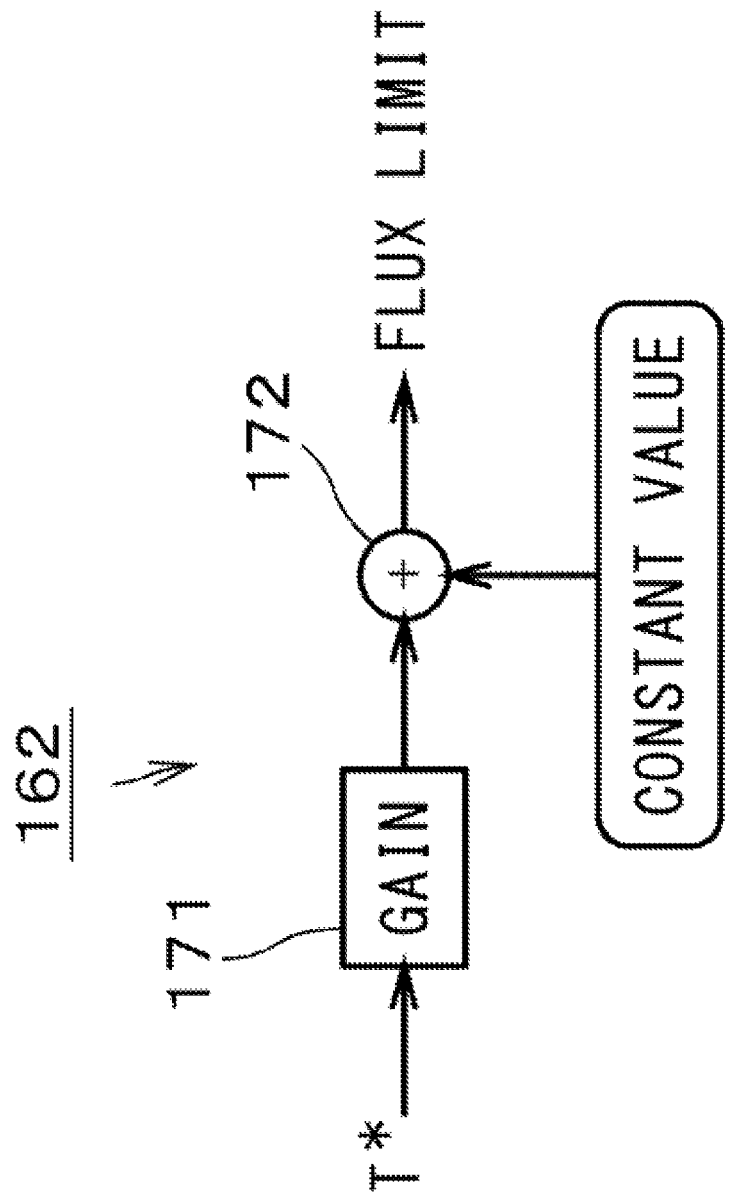
FIG. 8 shows a flux limit calculator according to a preferred embodiment of the present invention.

FIG. 8 shows the flux limit calculator 162. The flux limit calculator 162 preferably includes a gain operator 171 and an adder 172. Reference torque T* is inputted to the gain operator 171 and the reference torque is multiplied by a gain. A predetermined constant value is added to an output from the gain operator 171 by the adder 172 to obtain flux limit As mentioned above, the flux limit is increased by the flux limit calculator 162 as the reference torque becomes larger, and necessary torque is obtained while preventing any one of phase fluxes from becoming excessively large. As a result, torque ripple is reduced as shown later and vibration and noise decrease.

Figure 9:
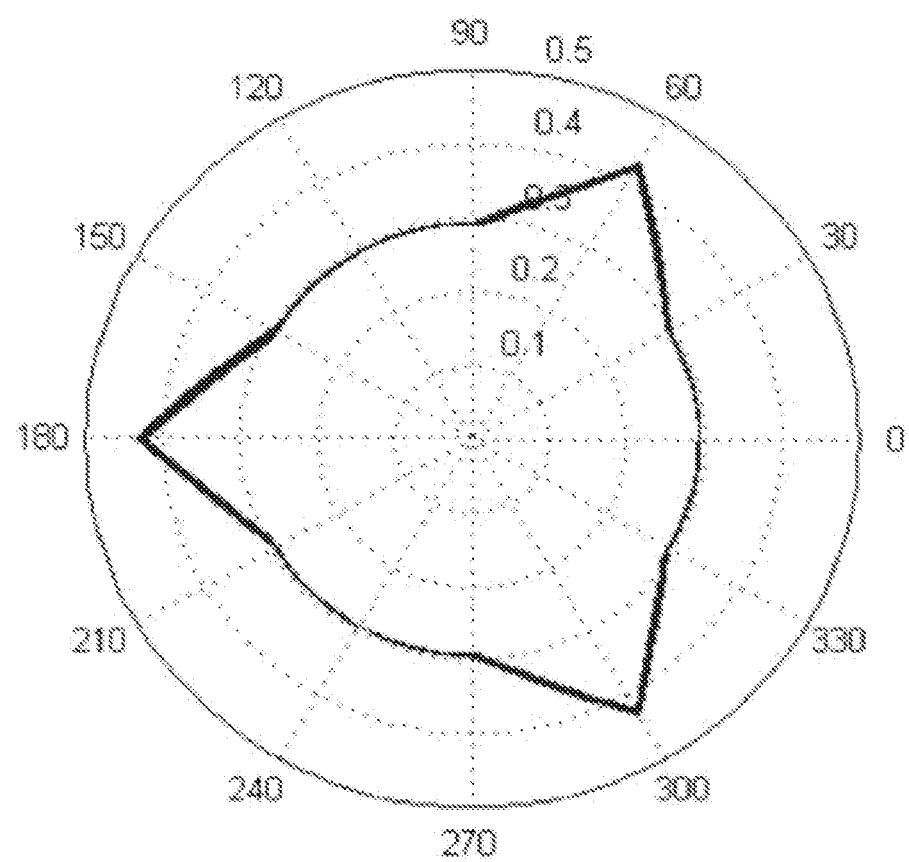
FIG. 9 shows a flux trajectory according to a preferred embodiment of the present invention.

FIG. 9 shows an example of a trajectory of reference flux obtained by simulating above-mentioned phase flux limiting control. As shown in FIG. 9, the magnitude of the reference flux is not constant. The flux trajectory includes three protruding portions. The three protruding portions are located at 120 degree pitch of electrical angle.

Figure 10A:
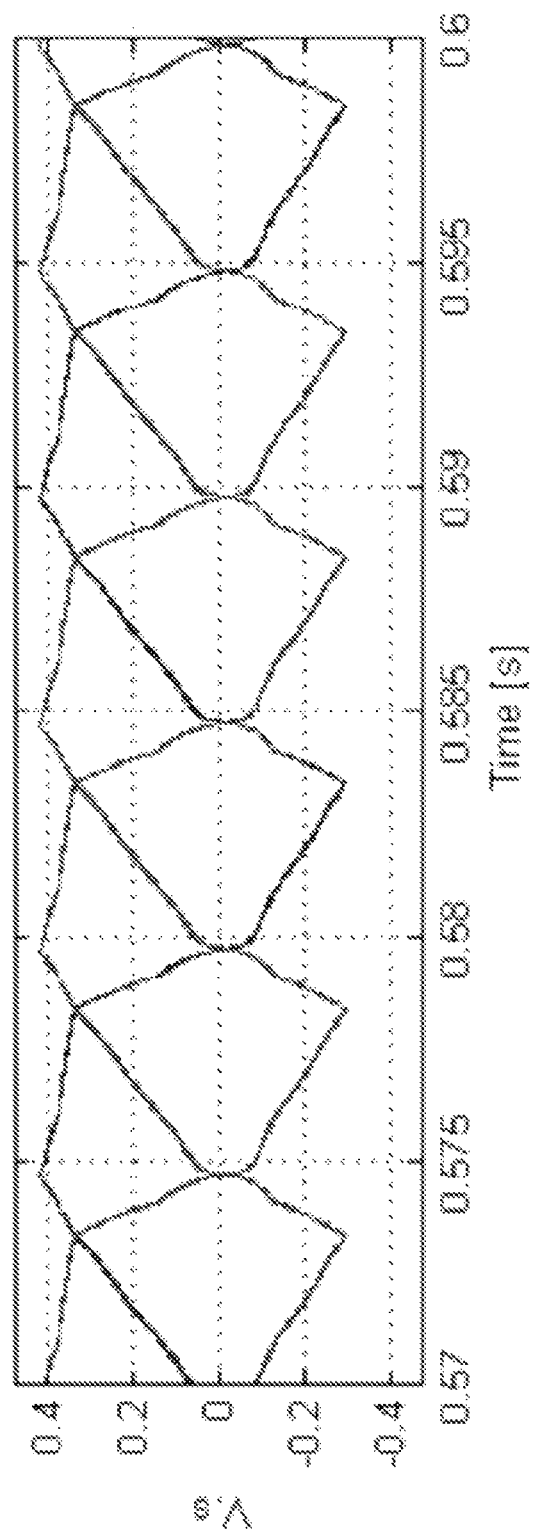
FIG. 10A shows phase fluxes according to a preferred embodiment of the present invention.
Figure 10B:
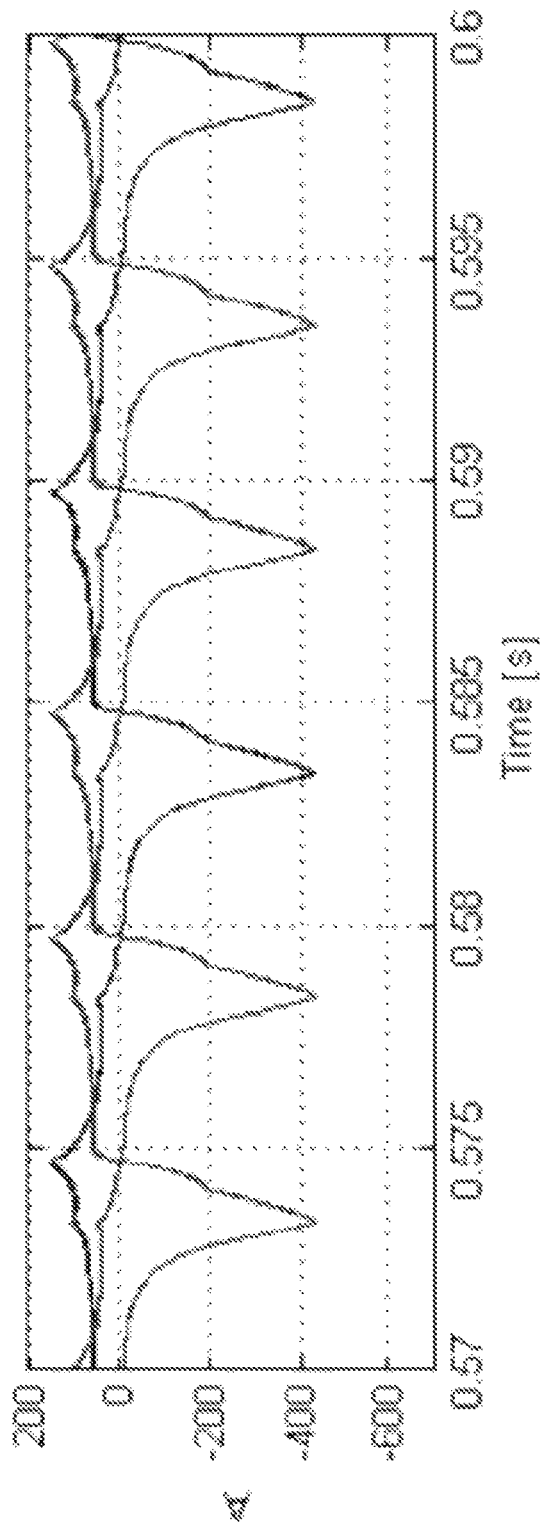
FIG. 10B shows phase currents according to a preferred embodiment of the present invention.
Figure 11:
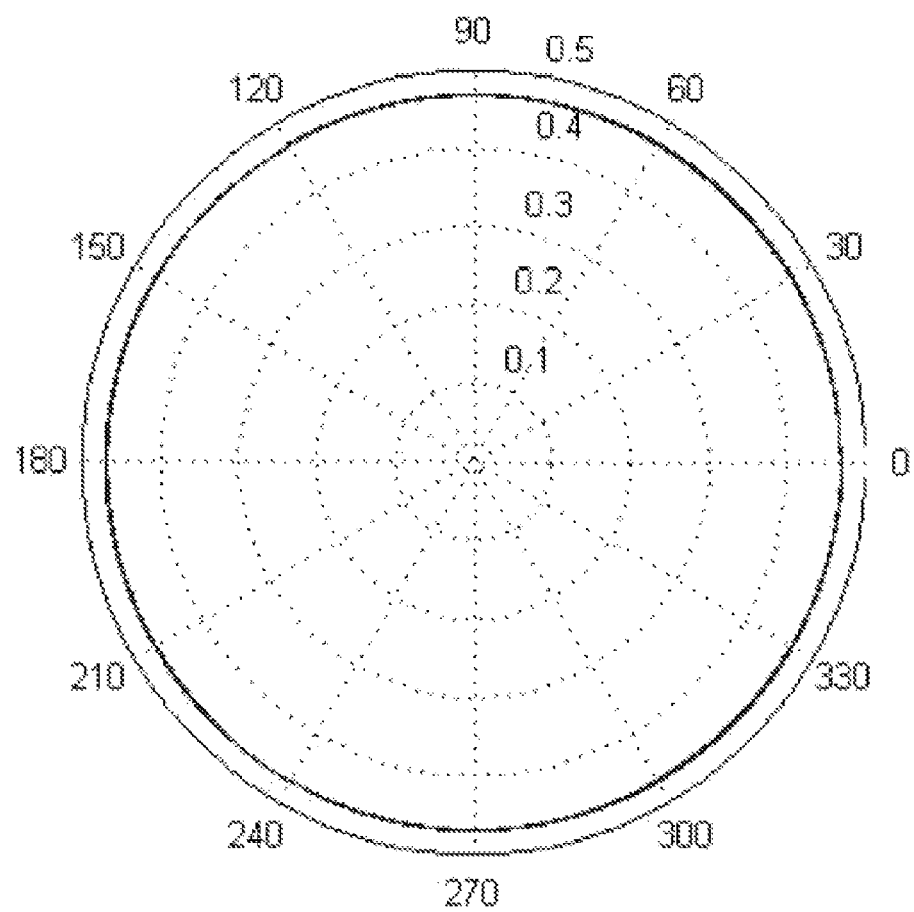
FIG. 11 shows a flux trajectory under conventional control.
Figure 12A:
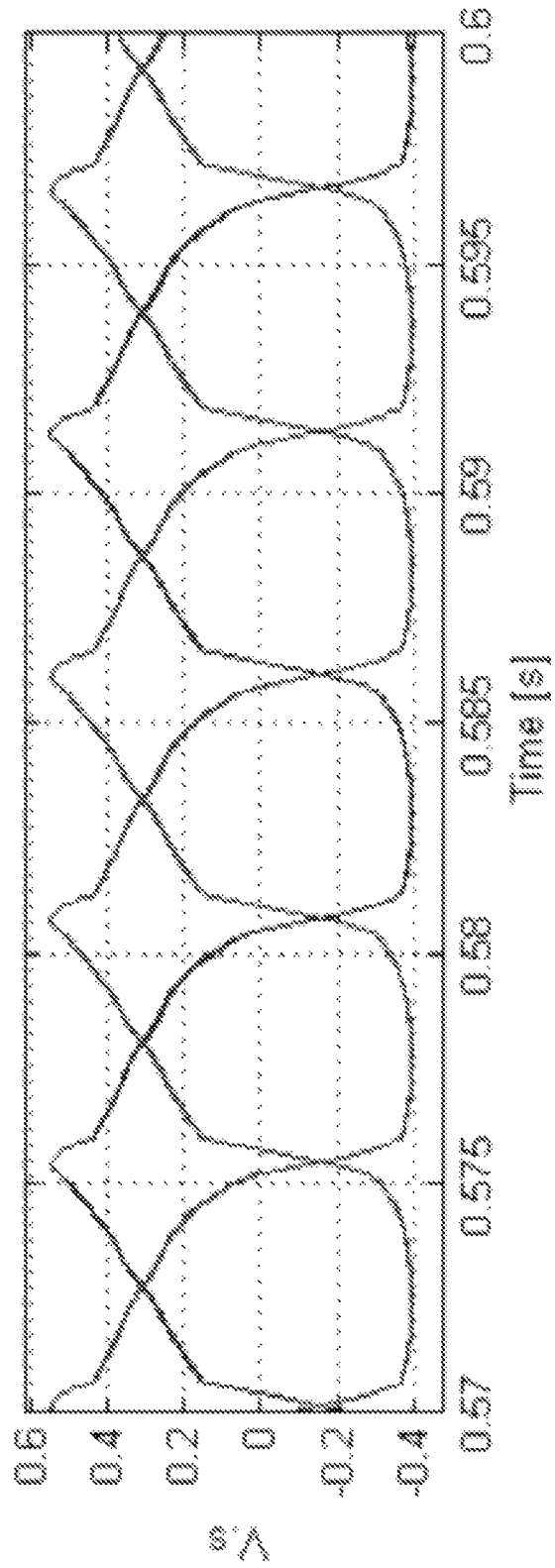
FIG. 12A shows phase fluxes under conventional control.
Figure 12B:
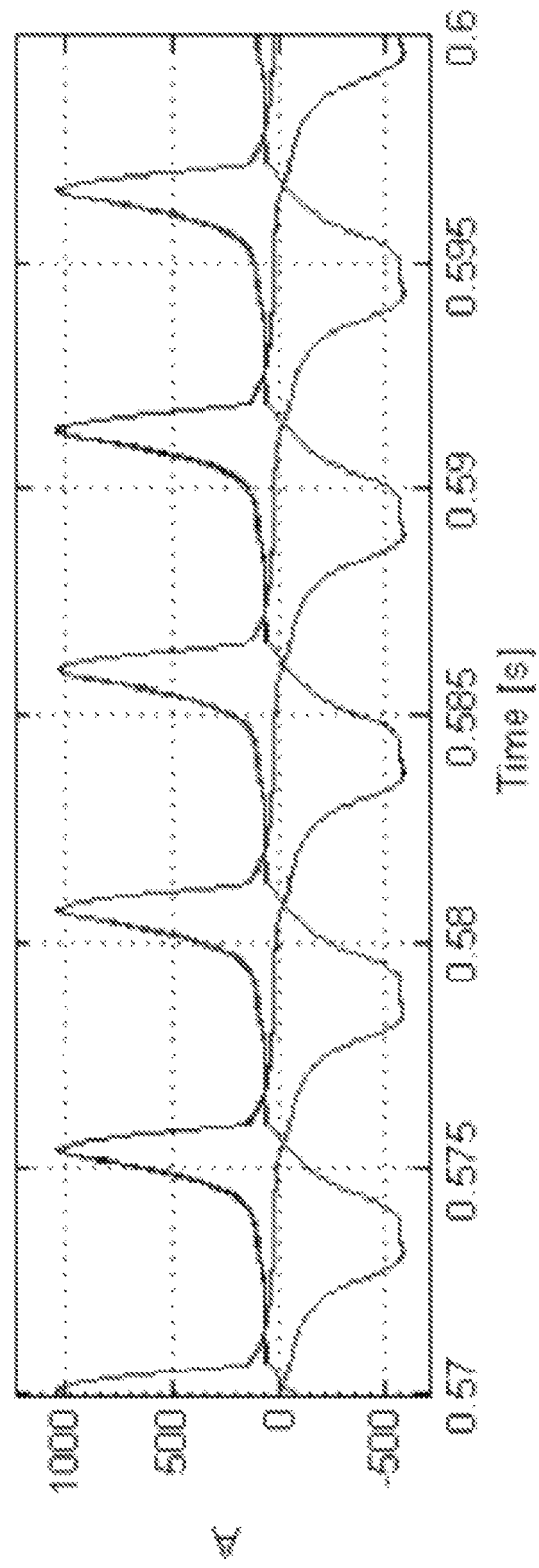
FIG. 12B shows phase currents under conventional control.

FIG. 10A shows three phase fluxes under above-mentioned flux limiting control. FIG. 10B shows three phase currents corresponding to FIG. 10A. FIG. 11 shows a conventional flux trajectory for DTC which has a constant flux magnitude. FIG. 12A shows three phase fluxes in an SRM under DTC using a circular flux trajectory of FIG. 11. FIG. 12B shows three phase currents corresponding to FIG. 12A.

The magnitude of flux vector is constant in the circular flux trajectory, while each phase inductance changes in an SRM. Because flux is the product of current and inductance, a phase flux does not change greatly while a phase inductance changes greatly in the circular flux trajectory, it is necessary to change a phase current largely. However, because of the power supply limitations regarding voltage or current, high current may not be supplied. This problem is more serious at high speed rotation where high back EMF limits current supply.

It is seen in FIGS. 10A and 12A that the maximum amplitude of phase flux is suppressed by the above-mentioned flux limiting control compared with the case where the conventional DTC is simply applied to an SRM. FIGS. 10B and 12B show that the maximum amplitude of phase current is also suppressed compared with the case where conventional DTC is simply applied to an SRM. In other words, the amplitudes of current pulses decrease as a result of the flux limiting control.

Figure 13A:
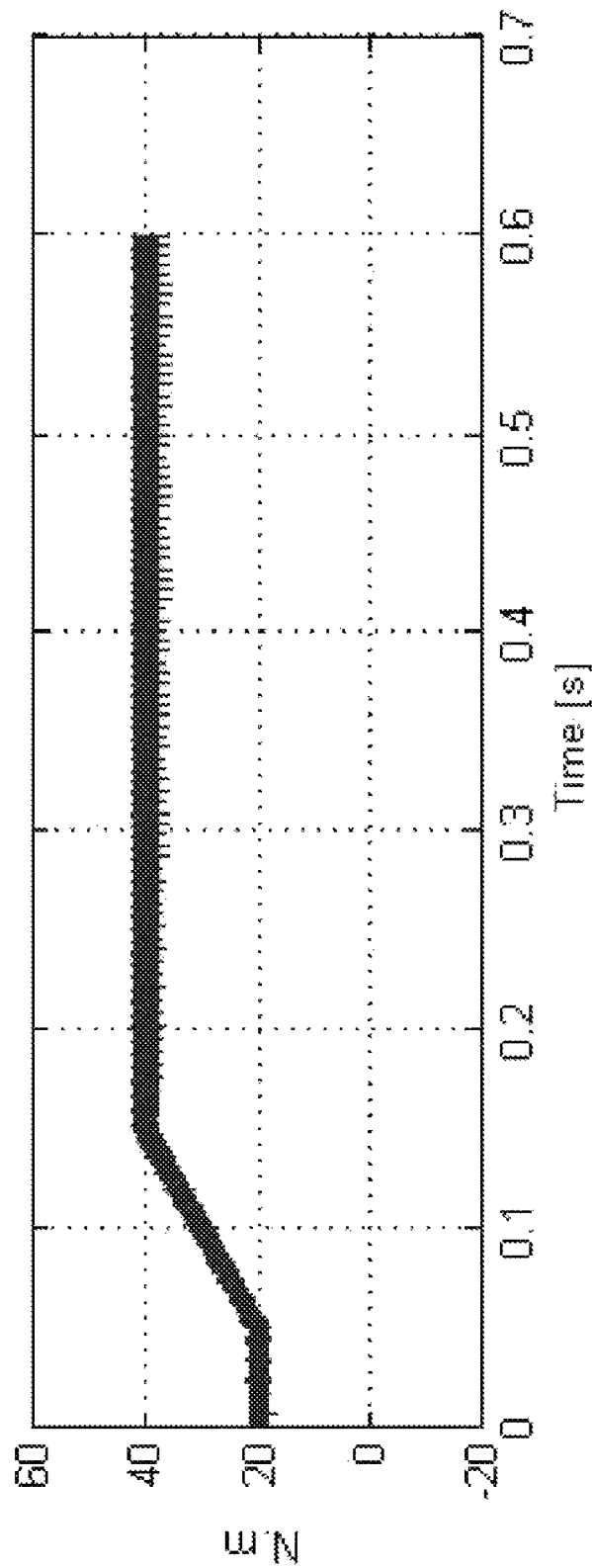
FIG. 13A shows changing of torque according to a preferred embodiment of the present invention.
Figure 13B:
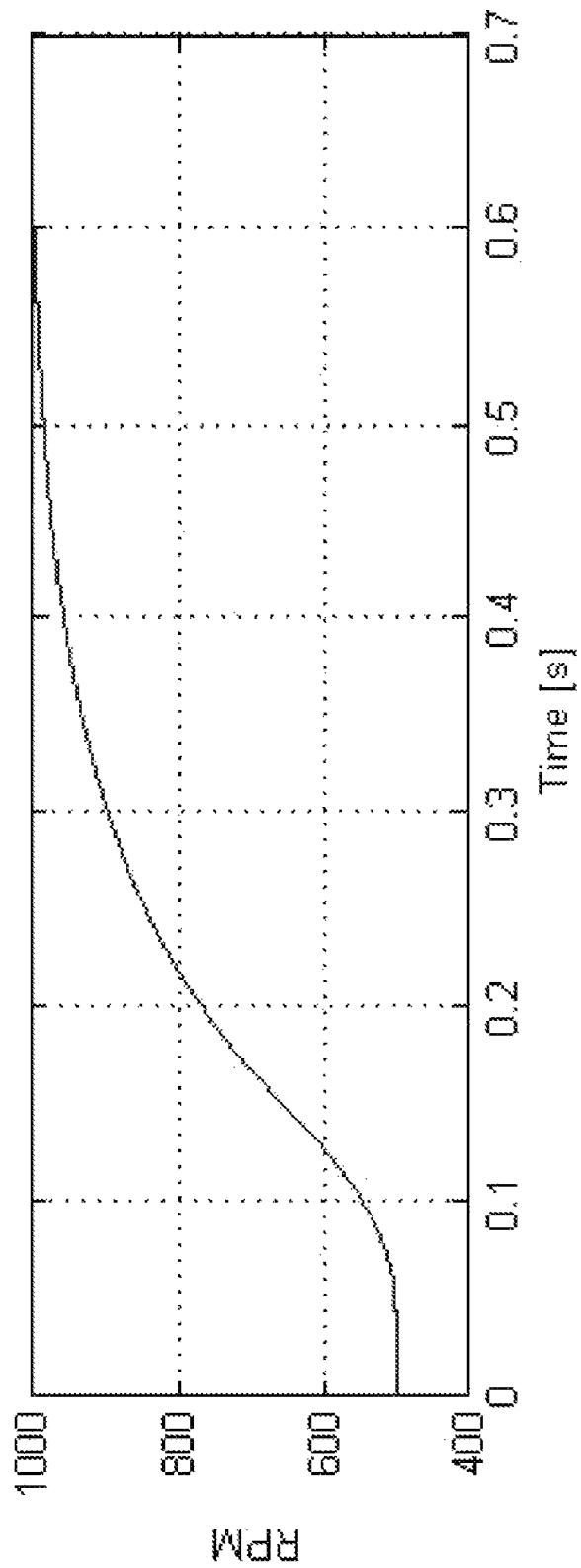
FIG. 13B shows changing of rotating speed corresponding to FIG. 13A.
Figure 14A:
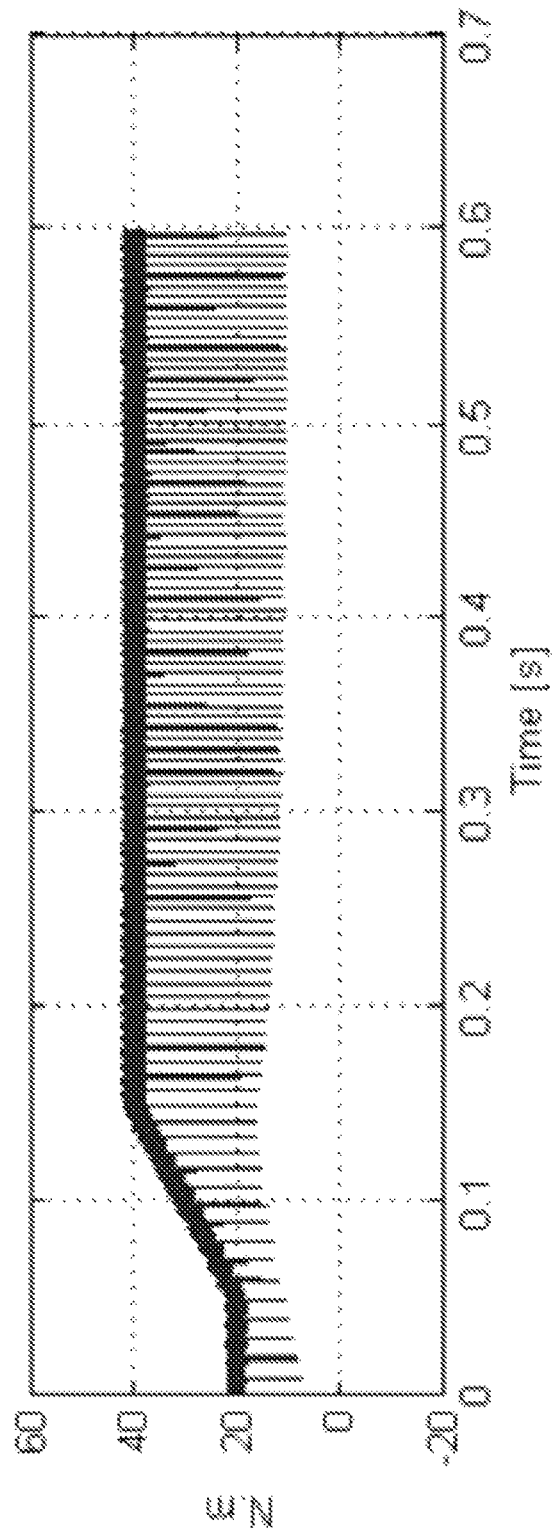
FIG. 14A shows changing of torque under conventional control.
Figure 14B:
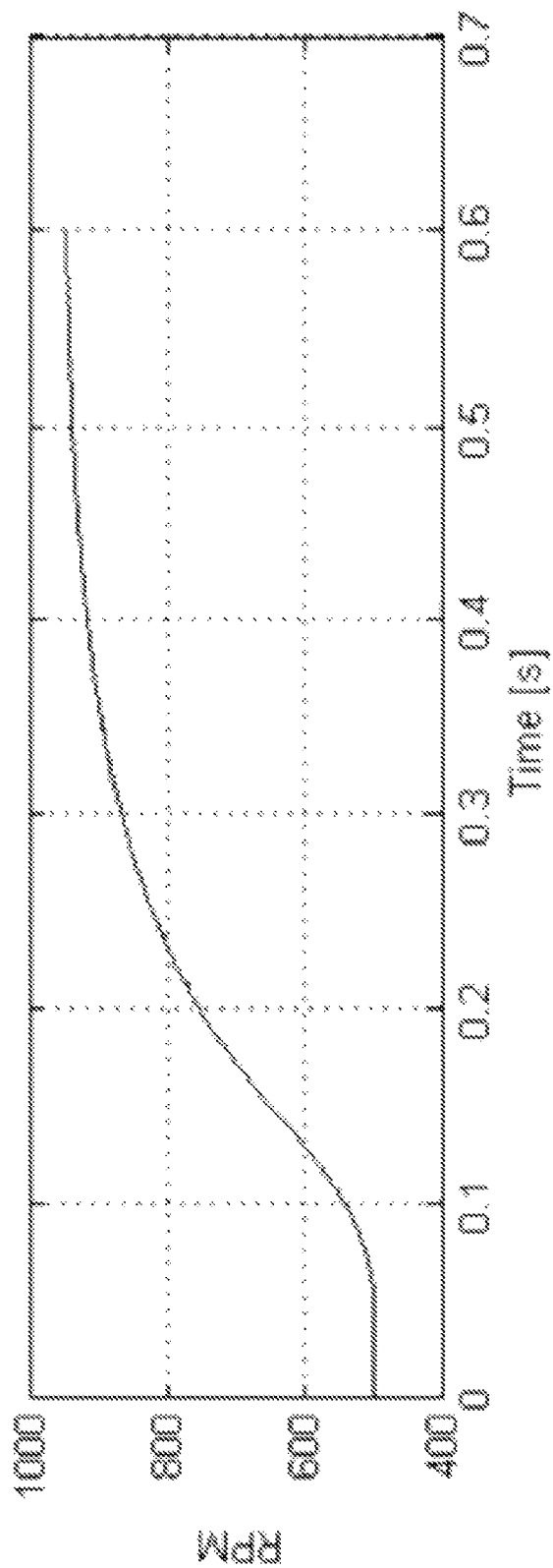
FIG. 14B shows changing of rotating speed corresponding to FIG. 14A.

FIG. 13A shows a change of torque outputted from an SRM under the flux limiting control, and FIG. 13B shows a change of rotating speed corresponding to FIG. 13A. FIG. 14A shows a change of torque outputted from an SRM in the case where conventional DTC is simply applied to an SRM, and FIG. 14B shows a change of rotating speed corresponding to FIG. 14A. As shown in FIGS. 13A and 14A, torque ripple is significantly reduced under the control of suppressing maximum amplitude of phase fluxes.

Figure 15A:
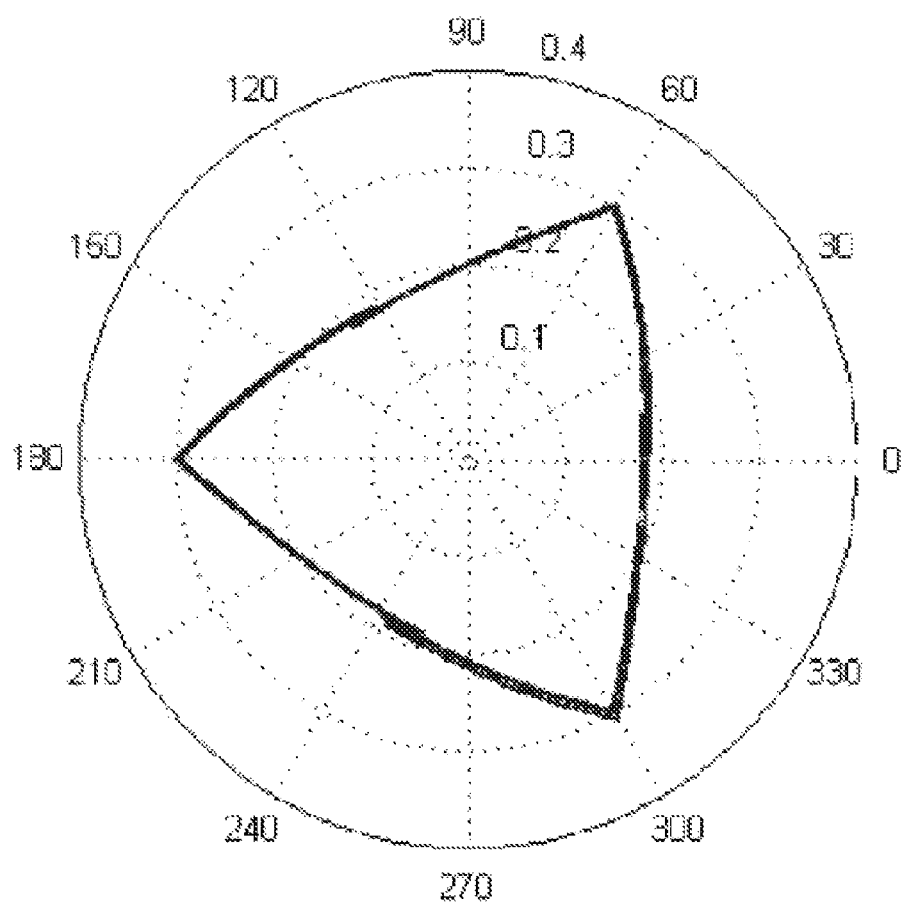
FIG. 15A shows a flux trajectory according to a preferred embodiment of the present invention.

FIG. 15A shows another example of a trajectory of reference flux obtained under above-mentioned phase flux limiting control. The trajectory of FIG. 15A is obtained by simulating another SRM under PI control which is different from the case of FIG. 9. As shown in FIG. 15A, magnitude of reference flux is not constant. The flux trajectory has three protruding portions. The three protruding portions are located at 120 degree pitch of electrical angle. The flux trajectory is almost an equilateral triangle in FIG. 15A.

Figure 15B:
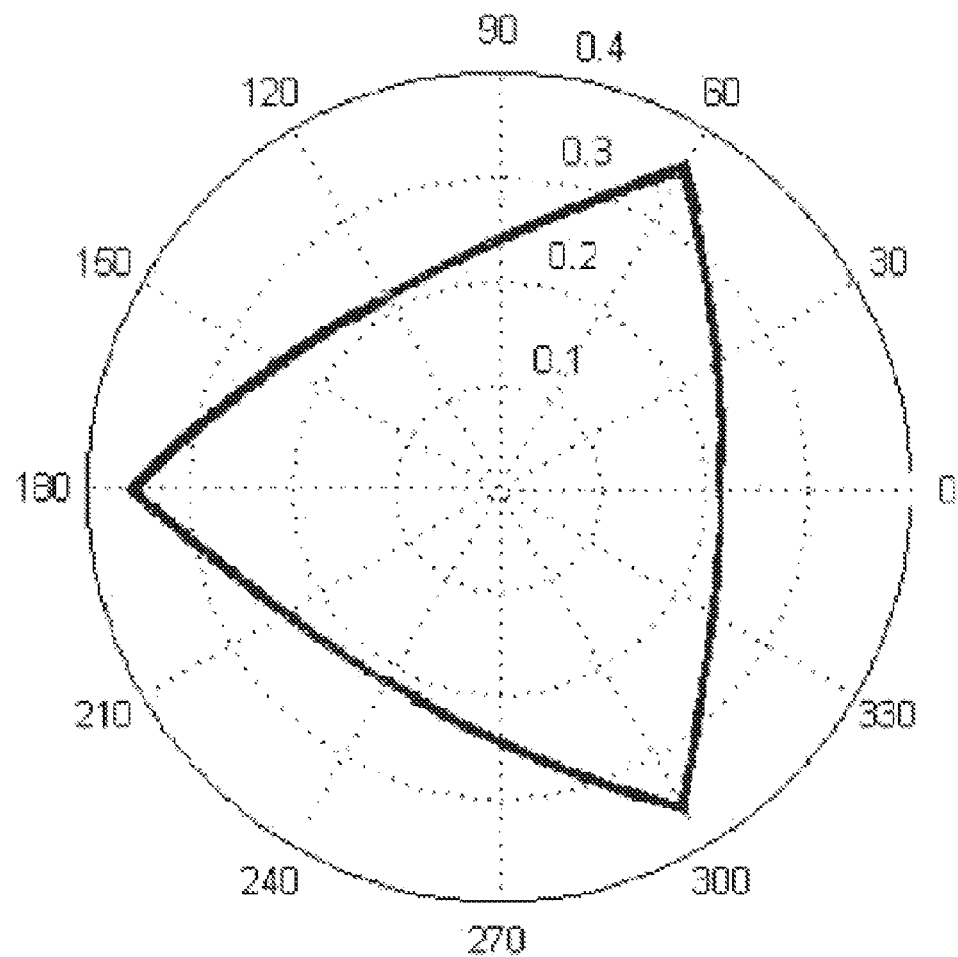
FIG. 15B shows a flux trajectory according to a preferred embodiment of the present invention.
Figure 15C:
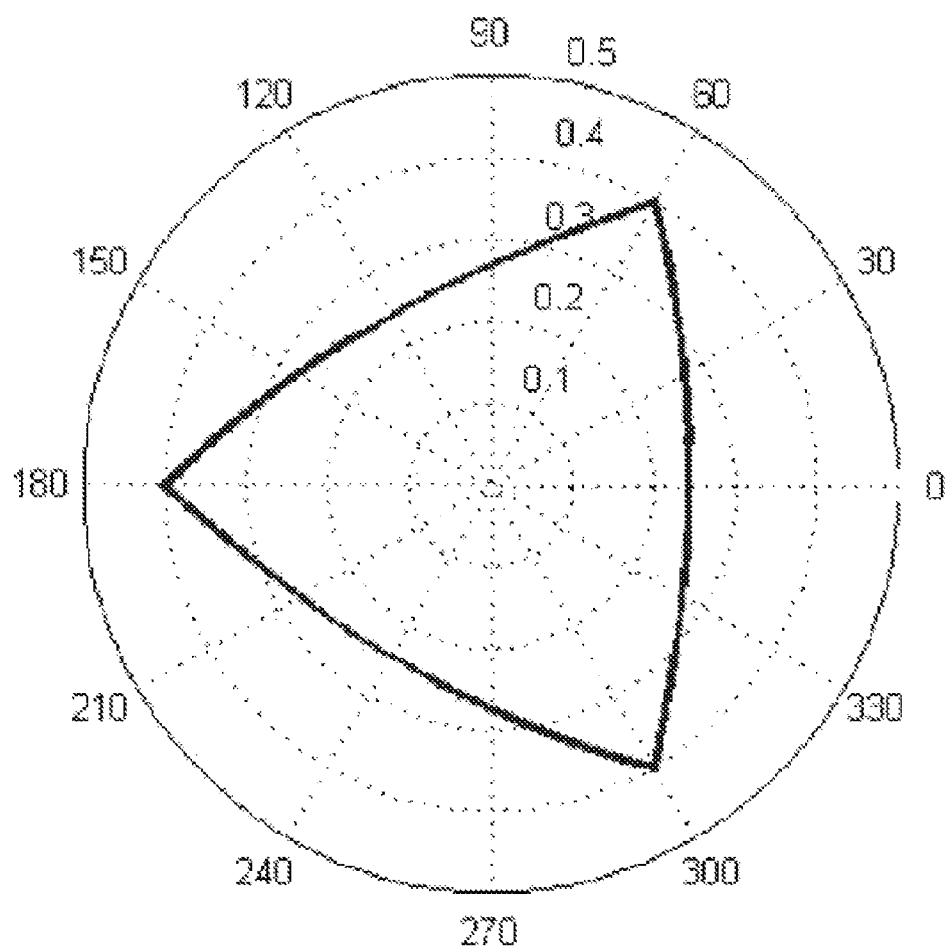
FIG. 15C shows a flux trajectory according to a preferred embodiment of the present invention.
Figure 15D:
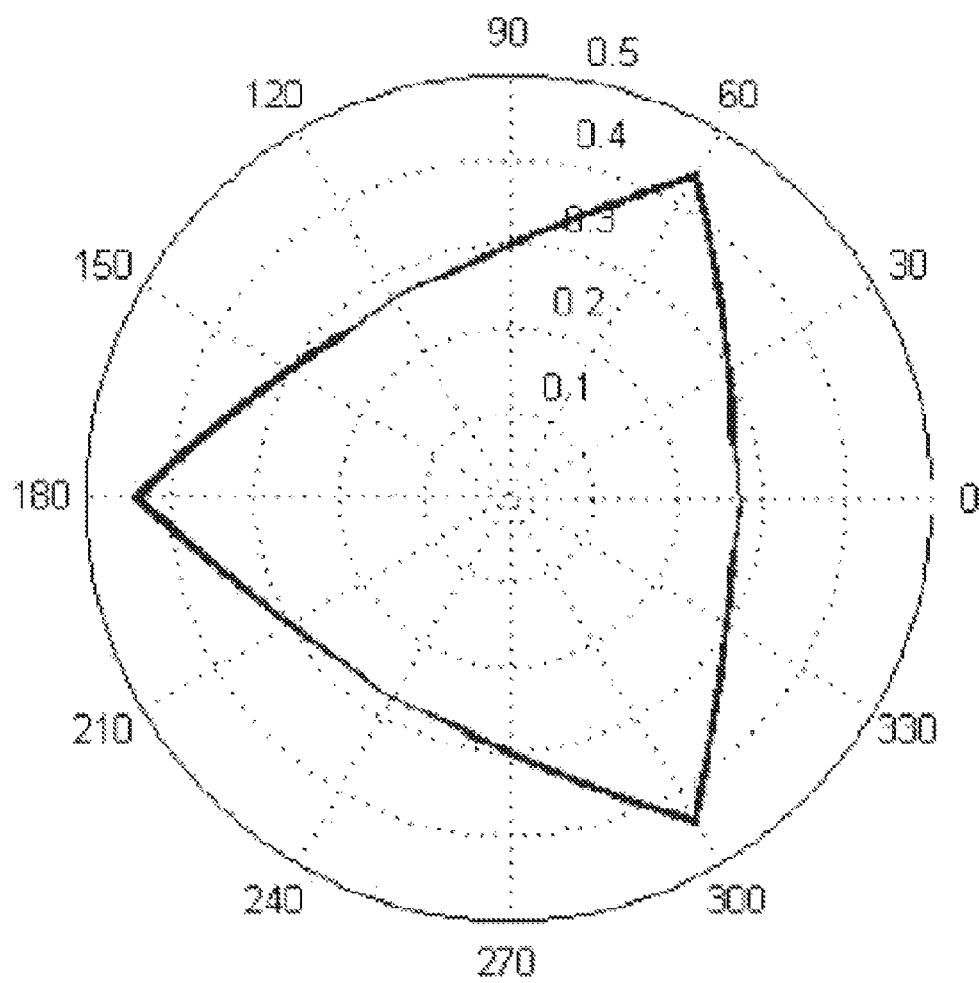
FIG. 15D shows a flux trajectory according to a preferred embodiment of the present invention.

FIG. 15A shows a flux trajectory of an SRM in a steady state where reference flux is 10 Nm and rotating speed is 250 rpm, for example. FIG. 15B shows a flux trajectory where reference flux is 20 Nm and rotating speed is 500 rpm, FIG. 15C shows a flux trajectory where reference flux is 30 Nm and rotating speed is 750 rpm, FIG. 15D shows a flux trajectory where reference flux is 40 Nm and rotating speed is 1000 rpm, for example. As the reference torque is greater, the size of flux trajectory becomes larger.

Figure 16A:
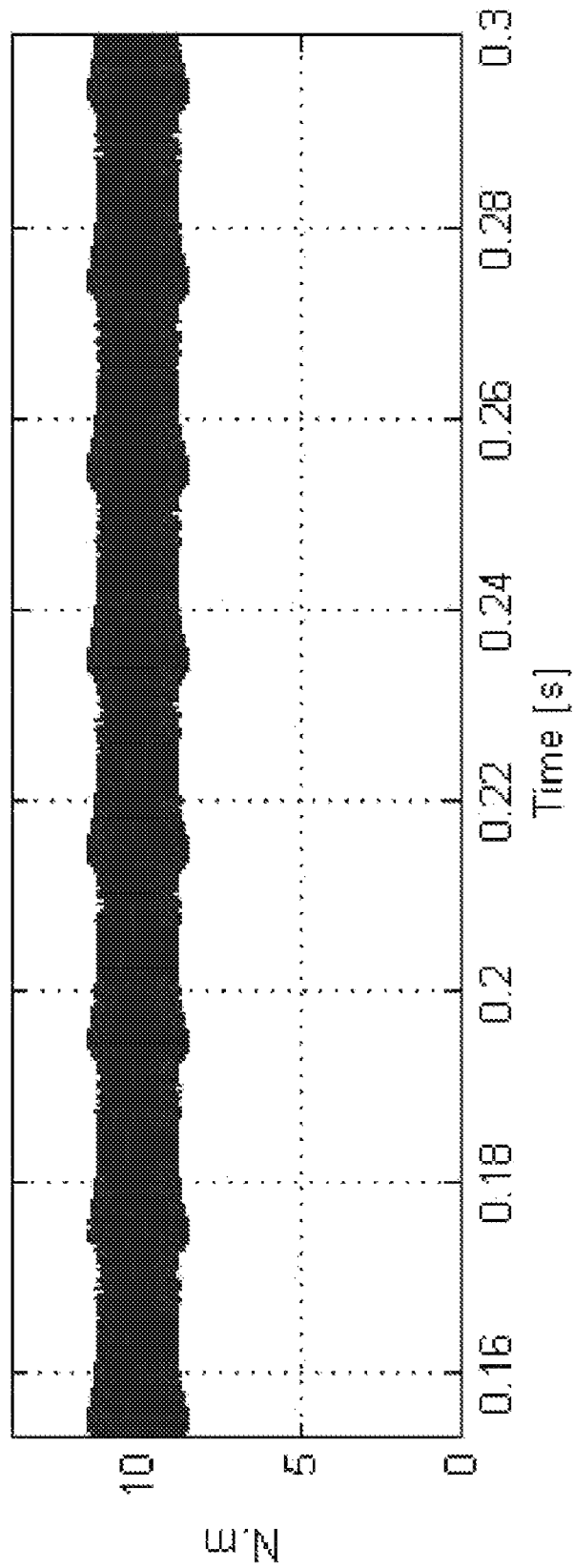
FIG. 16A shows torque corresponding to FIG. 15A.
Figure 16B:
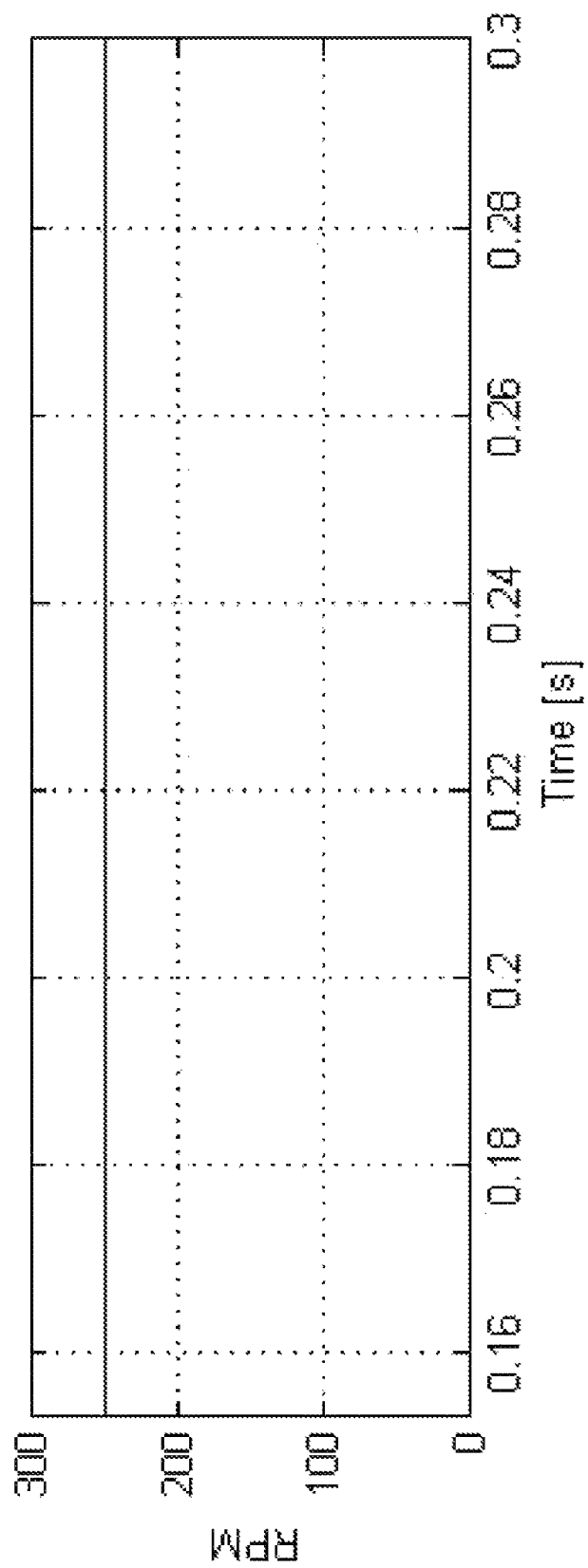
FIG. 16B shows rotating speed corresponding to FIG. 16A.
Figure 17A:
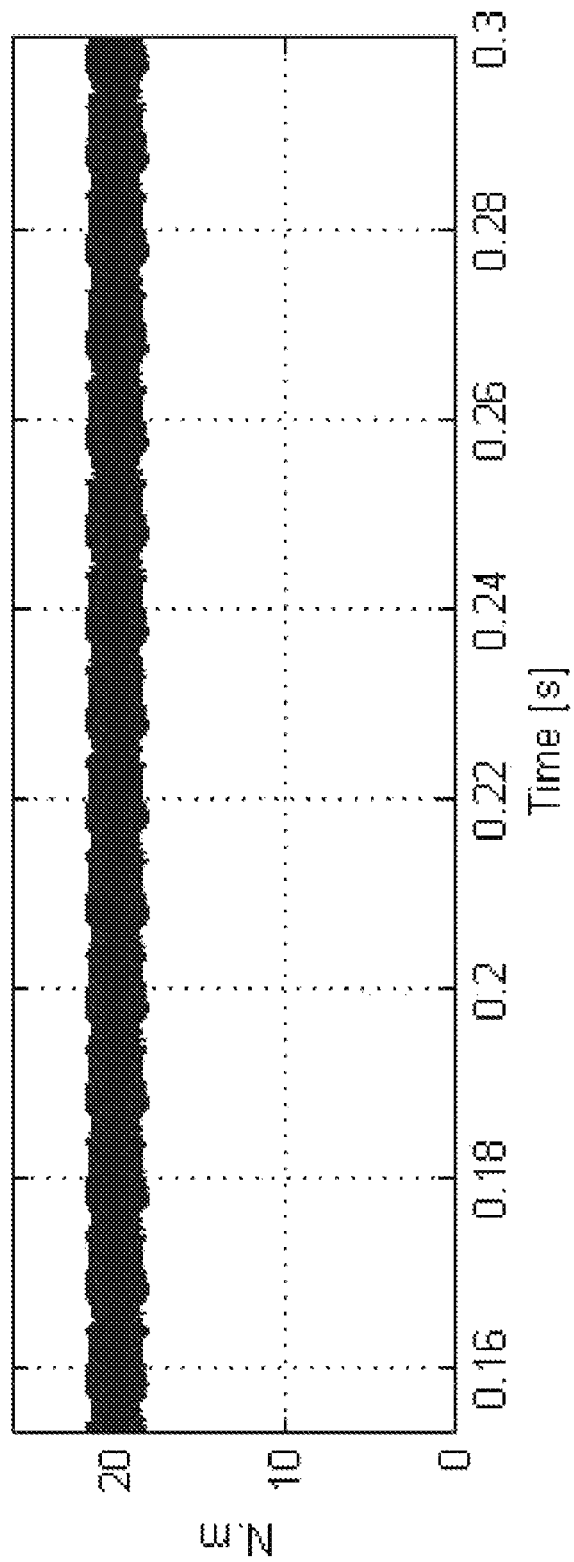
FIG. 17A shows torque corresponding to FIG. 15B.
Figure 17B:
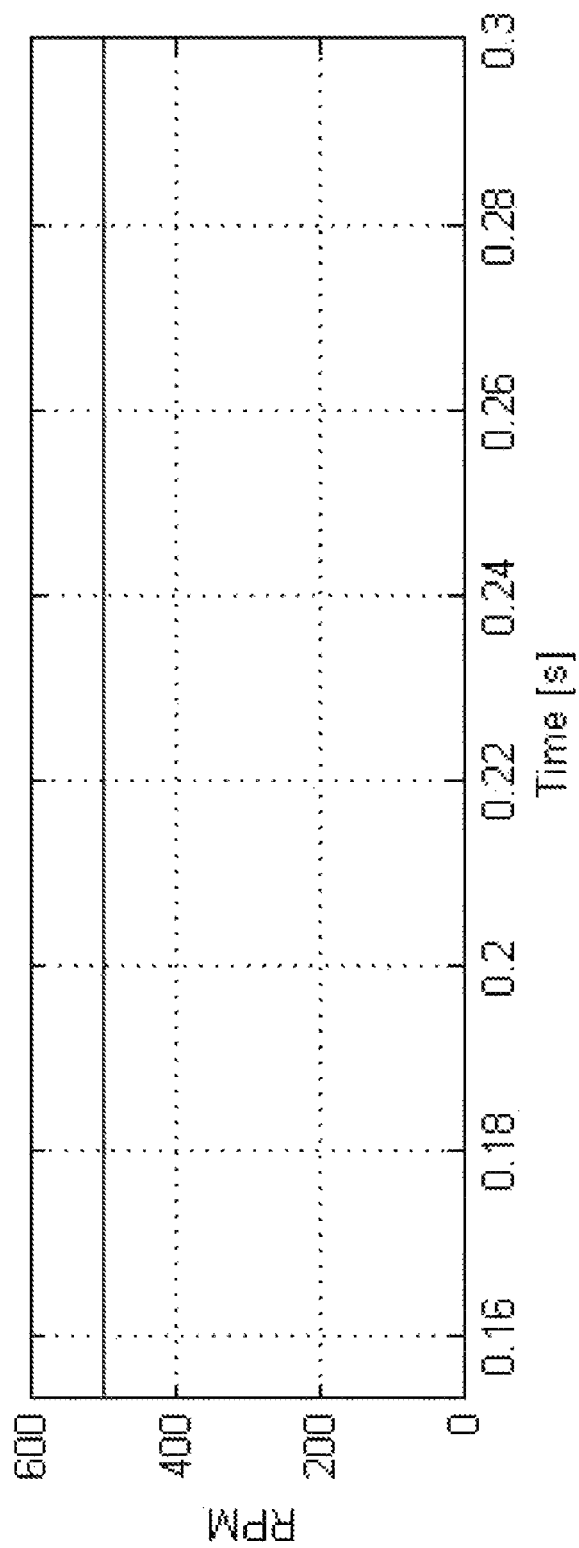
FIG. 17B shows rotating speed corresponding to FIG. 17A.
Figure 18A:
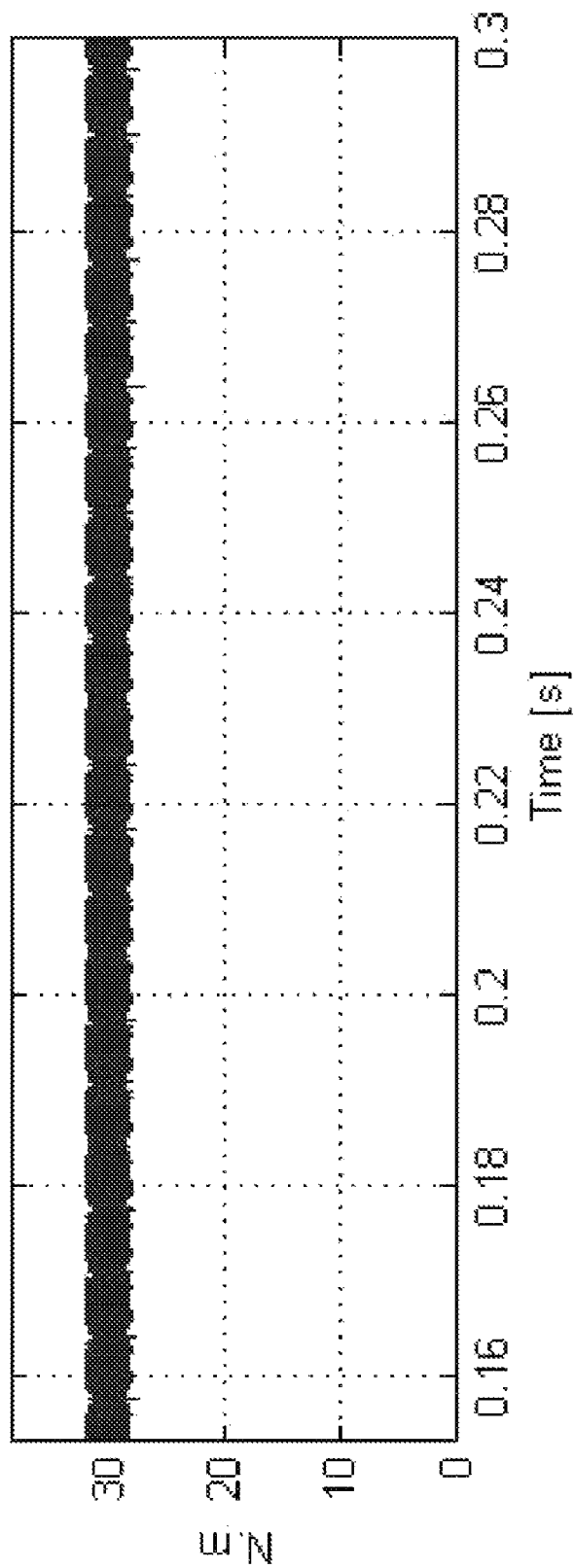
FIG. 18A shows torque corresponding to FIG. 15C.
Figure 18B:
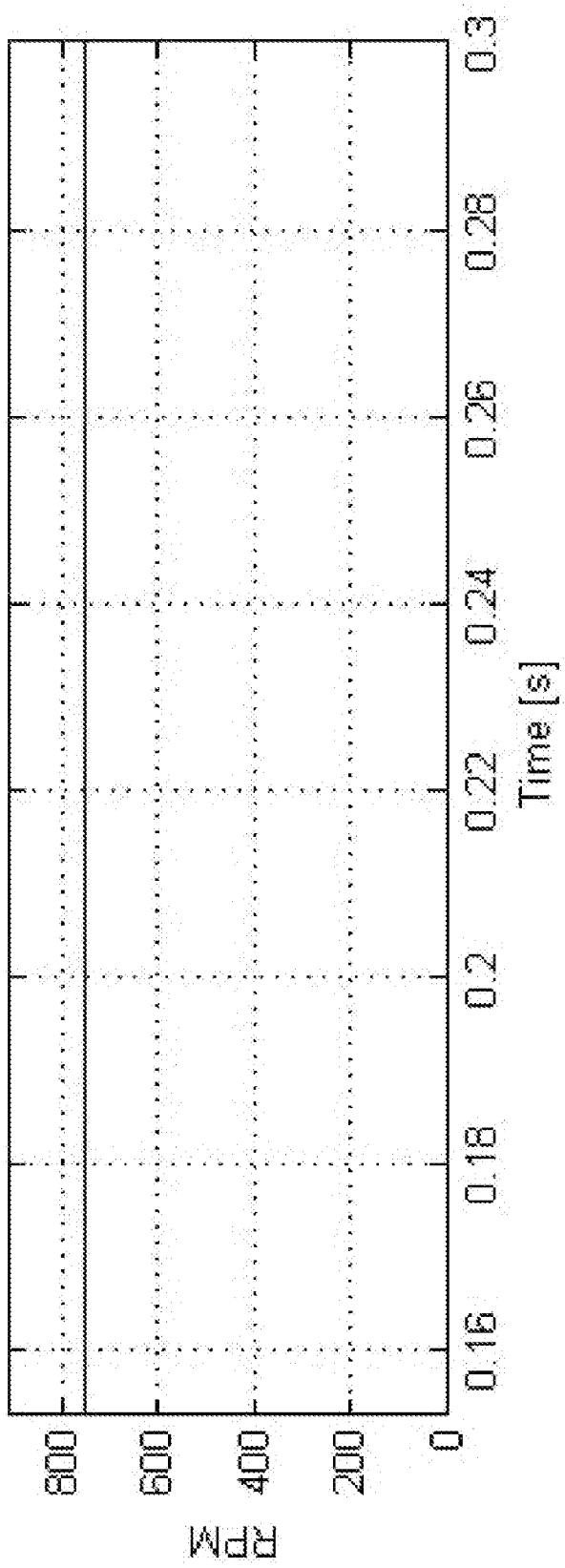
FIG. 18B shows rotating speed corresponding to FIG. 18A.
Figure 19A:
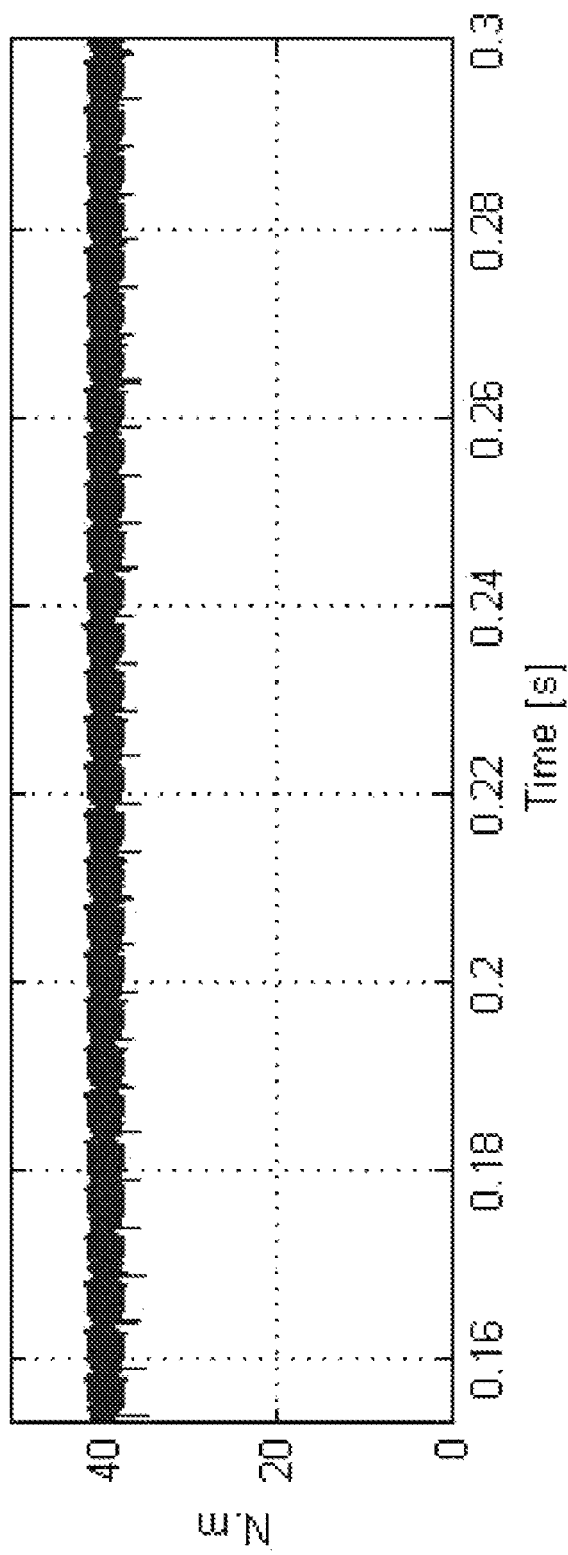
FIG. 19A shows torque corresponding to FIG. 15D.
Figure 19B:
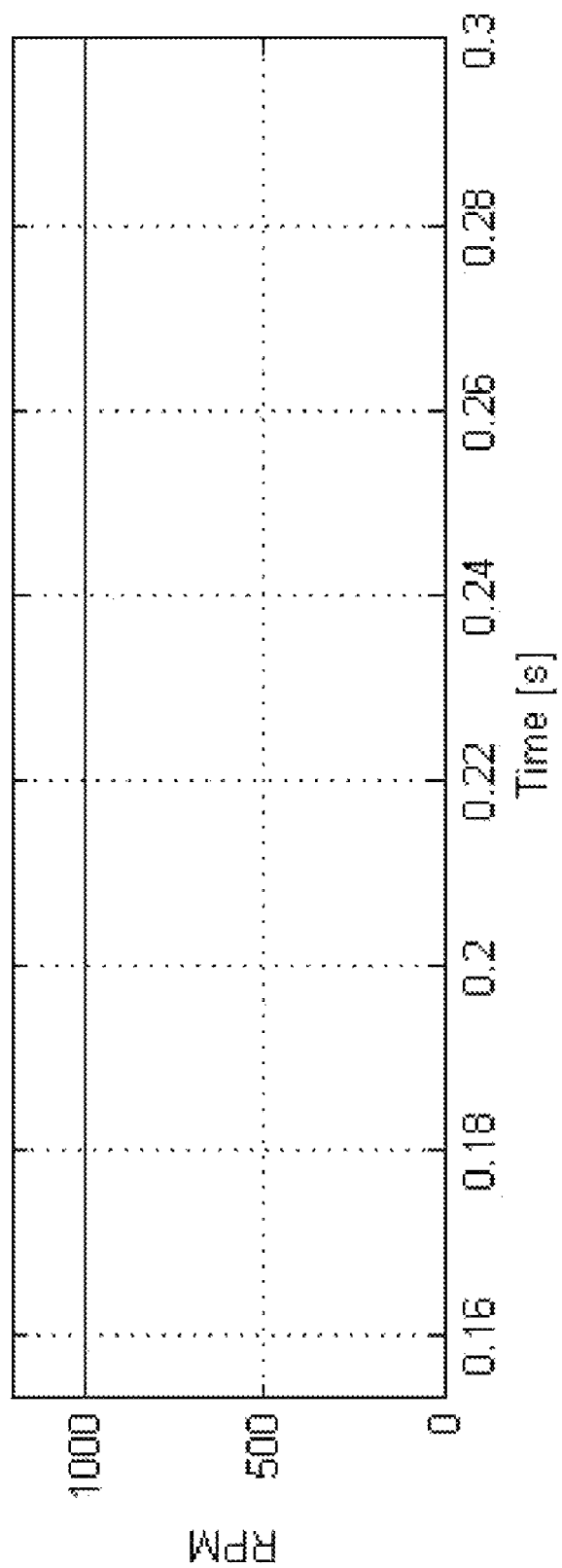
FIG. 19B shows rotating speed corresponding to FIG. 19A.

FIGS. 16A and 16B show torque outputted from the SRM and rotating speed, respectively, corresponding to FIG. 15A. FIGS. 17A and 17B show torque and rotating speed corresponding to FIG. 15B. FIGS. 18A and 18B show torque and rotating speed corresponding to FIG. 15C. FIGS. 19A and 19B show torque and rotating speed corresponding to FIG. 15D. As shown FIGS. 16A to 19A, the torque ripple is small under the above-mentioned phase flux limiting control.

Figure 20A:
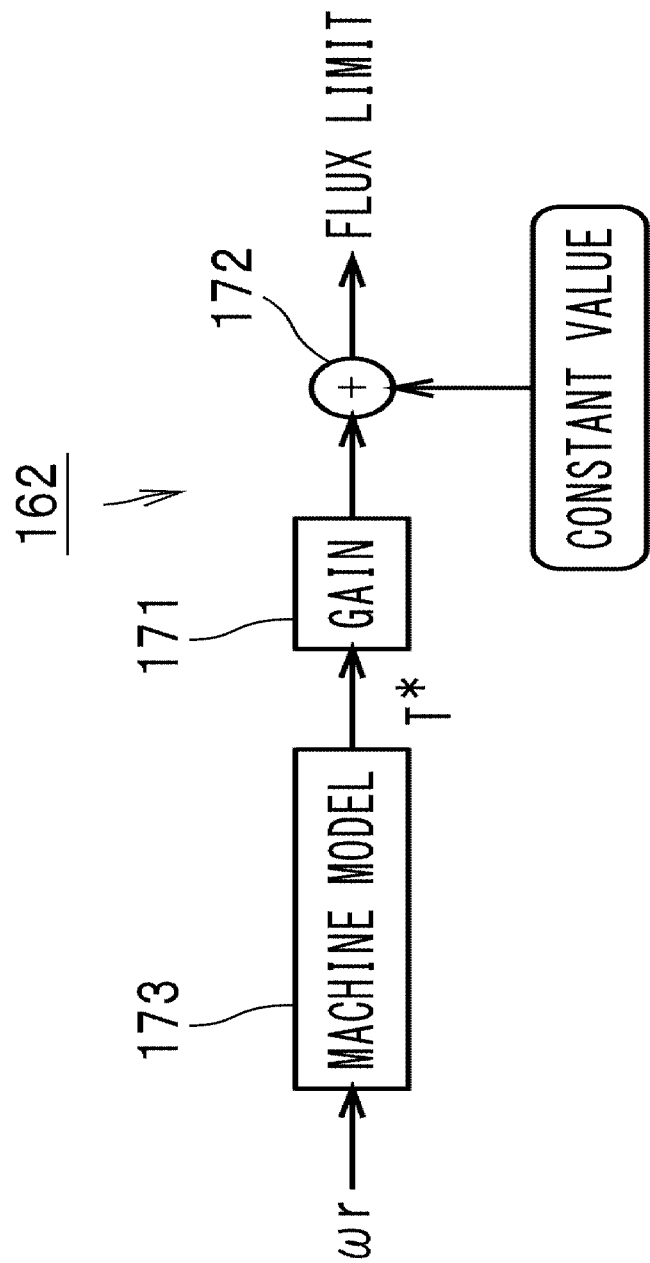
FIG. 20A shows another example of a flux limit calculator according to a preferred embodiment of the present invention.

FIG. 20A shows another example of the flux limit calculator 162 according to a preferred embodiment of the present invention. The flux limit calculator 162 of FIG. 20A preferably further includes a machine model 173 which is configured to simulate a mechanism of SRM and condition for the SRM. Rotating speed is inputted to the machine model 173 and the rotating speed is converted to reference torque T*. The reference torque T* is converted to flux limit by a gain operator 171 and an adder 172 in the same way as shown in FIG. 8. The flux limit is increased by the flux limit calculator 162 as the rotating speed gets higher and necessary torque is obtained while preventing any one of phase fluxes from becoming excessively large. As a result, torque ripple is significantly reduced.

As shown in FIG. 1, the rotating speed $\omega r$ is detected by a sensor provided in the SRM 9. The rotating speed $\omega r$ may be calculated from the rotor angle θr. In other words, both of a sensor obtaining the rotor angle θr and a sensor obtaining the rotating speed cur may be provided with the SRM 9, or only the sensor obtaining the rotor angle θr are preferably provided.

Figure 20B:
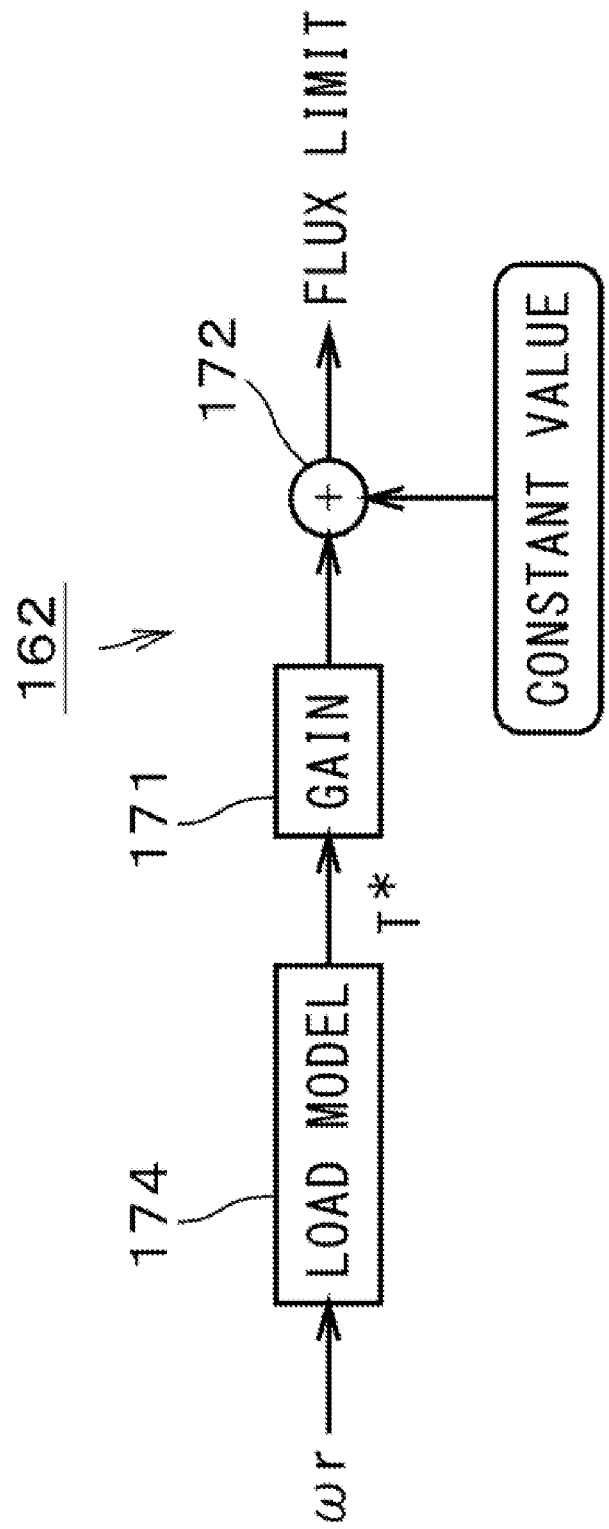
FIG. 20B shows still another example of a flux limit calculator according to a preferred embodiment of the present invention.
Figure 20C:
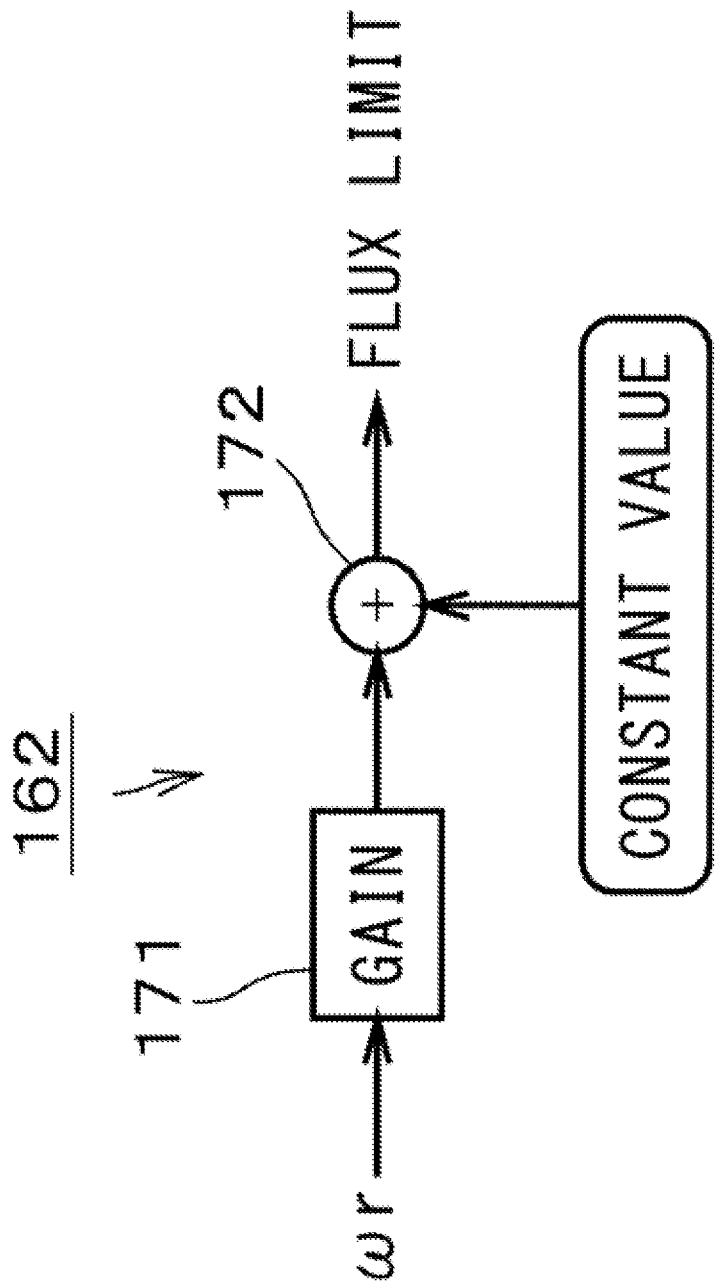
FIG. 20C shows still another example of a flux limit calculator according to a preferred embodiment of the present invention.

The machine model 173 may alternatively be replaced with a load model 174 as shown in FIG. 20B. The load model 174 preferably includes a table or function and converts rotating speed to reference torque. When reference torque is almost proportional to rotating speed, the load model 174 can be omitted as shown in FIG. 20C. The flux limit may be changed in accordance with both of reference torque and rotating speed. In other words, the reference flux calculator 16 is configured to change the flux limit based on at least one of reference torque and rotating speed.

Figure 21:
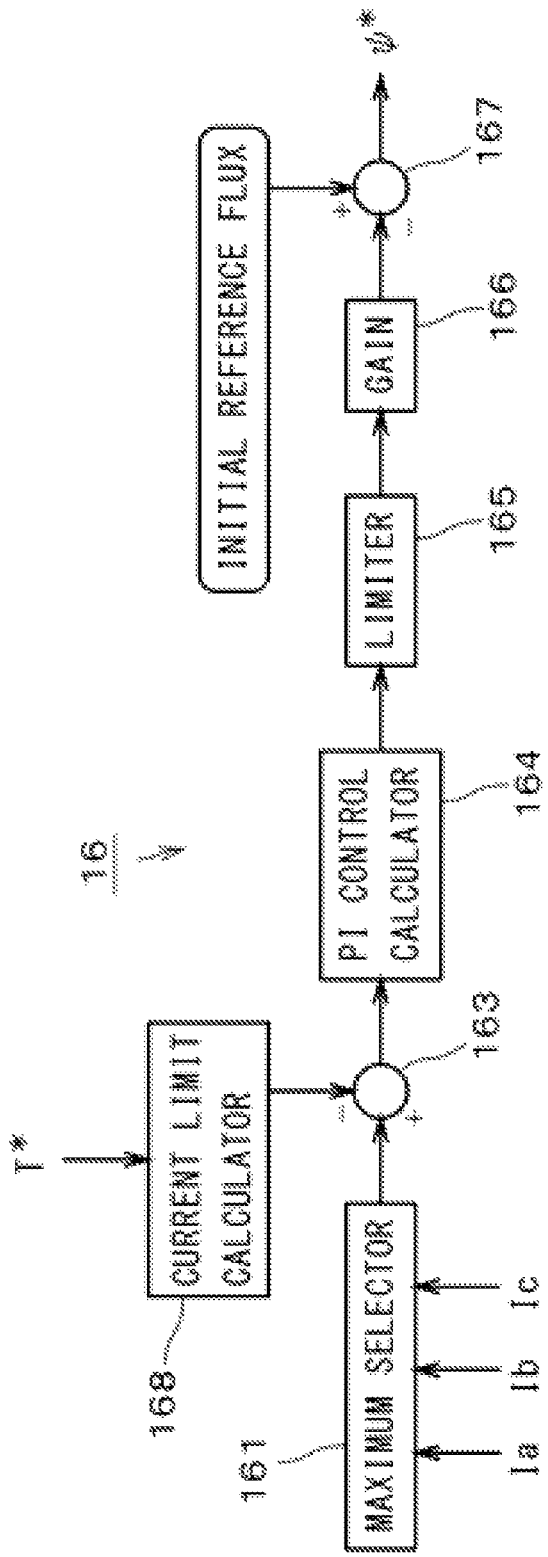
FIG. 21 shows another example of a reference flux calculator according to a preferred embodiment of the present invention.

FIG. 21 shows another example of a reference flux calculator 16 according to a preferred embodiment of the present invention. As compared with FIG. 7, the reference flux calculator 16 is different where three phase currents are inputted to the maximum selector 161 and the flux limit calculator 162 is replaced with a current limit calculator 168. The configuration of the current limit calculator 168 is preferably the same as in FIG. 8 except that a current limit is obtained. The reference flux calculator 16 of FIG. 21 is configured to compare the highest phase current out of three phase currents outputted from the inverter 11 with current limit and reduces the reference flux when the highest phase current is higher than the current limit. Current limit increases by the current limit calculator 168 as the referent torque is getting greater, and necessary torque is obtained while preventing any one of phase currents from becoming excessively large. As a result, torque ripple is significantly reduced with a simple configuration. The configuration of FIGS. 20A to 20C preferably is applied to the current limit calculator 168. The reference flux calculator 16 is configured to change the current limit based on at least one of reference torque and rotating speed.

Figure 22:
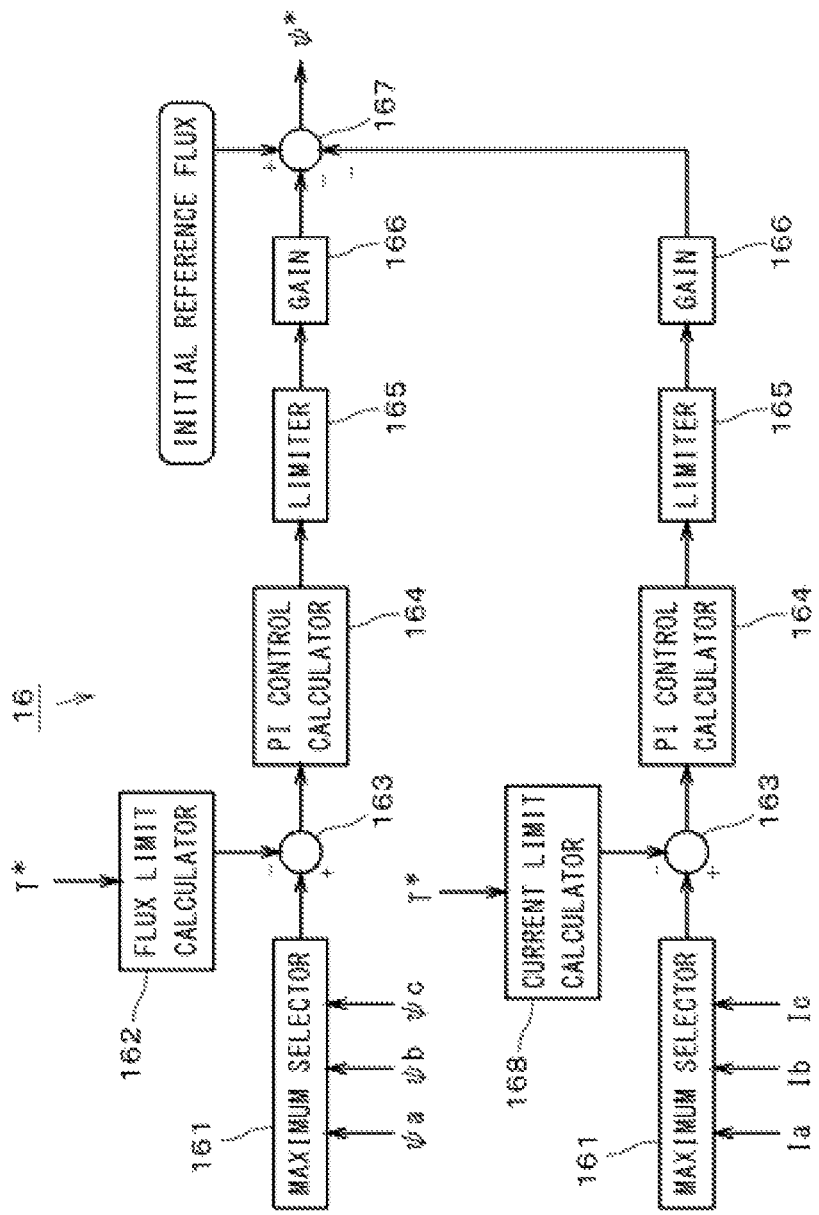
FIG. 22 shows still another example of a reference flux calculator according to a preferred embodiment of the present invention.

FIG. 22 shows still another example of a reference flux calculator 16 according to a preferred embodiment of the present invention. The reference flux calculator 16 of FIG. 22 is a combination of calculators of FIGS. 7 and 21. The subtractor 167 is configured to subtract a value obtained from three phase fluxes and a value obtained from three phase currents from an initial reference flux. The reference flux calculator 16 is configured to reduce the reference flux when the highest phase flux is higher than the flux limit and also reduces the reference flux when the highest phase current is higher than the current limit. Necessary torque is obtained while preventing any one of phase fluxes and phase currents from becoming excessively large. As a result, torque ripple is reduced. The configuration of FIGS. 20A to 20C preferably is applied to the flux limit calculator 162 and the current limit calculator 168.

Since the conventional DTC controls motors which do not have double saliency, the magnitude of the reference flux does not change greatly. Consequently, the shape of the conventional flux trajectory is circular or nearly polygonal. An SRM has double saliency; therefore, the reference flux should be changed greatly in accordance with the inductance. For the above reason, the motor controller 1 performs DTC with feedback control limiting the maximum value of phase fluxes and/or phase currents to reduce torque ripple.

The motor controller 1 is configured to control the SRM 9 under DTC. All DC link voltage is available for magnetization and demagnetization of phases; therefore, the motor can work in a whole speed range. As a result, conventional individual control algorithms are not needed at high, middle and low speeds, and this makes the motor control simple. Because a single algorithm is used for the entire speed area, it does not need complex setting. Dynamic response is much higher than previous SRM control by using DTC; therefore, the motor controller 1 is especially suitable for vehicular applications.

Moreover, a general-purpose inverter, which is, for example, a "three-phase VSI 6-pack", for other types of motors (IM, IPM, SPM etc.) can be utilized for the inverter 11. This makes it possible to reduce manufacturing cost, weight, size, assembling time and complexity of the motor controller 1, and to increase inverter reliability, and ruggedness.

Figure 23:
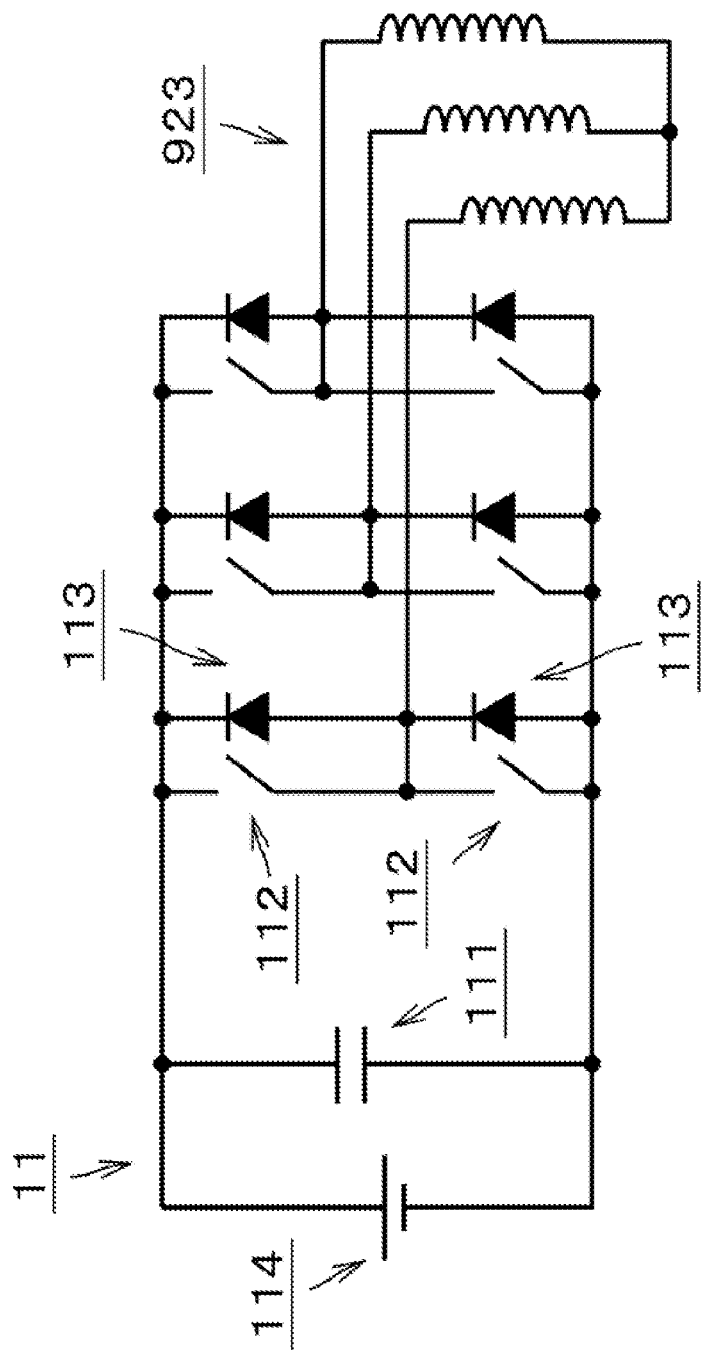
FIG. 23 shows a connection between the inverter and the winding according to a preferred embodiment of the present invention.

The DTC mentioned above can be applied to an SRM having a star-connected winding. The structure of the motor controller 1 in this case is the same as the structure shown in FIG. 1. FIG. 23 shows a connection between the inverter 11 and the winding 923 and corresponds to FIG. 3. The structure of the inverter 11 is also the same as the structure of a general-purpose inverter when a star-connected motor is controlled.

Figure 24:
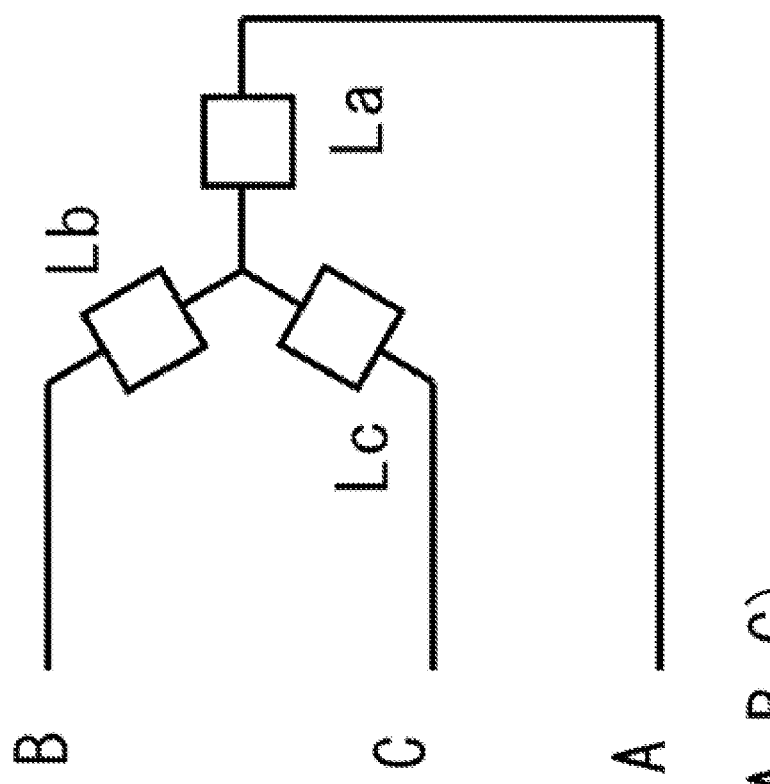
FIG. 24 shows a connection of coils according to a preferred embodiment of the present invention.
Figure 25:
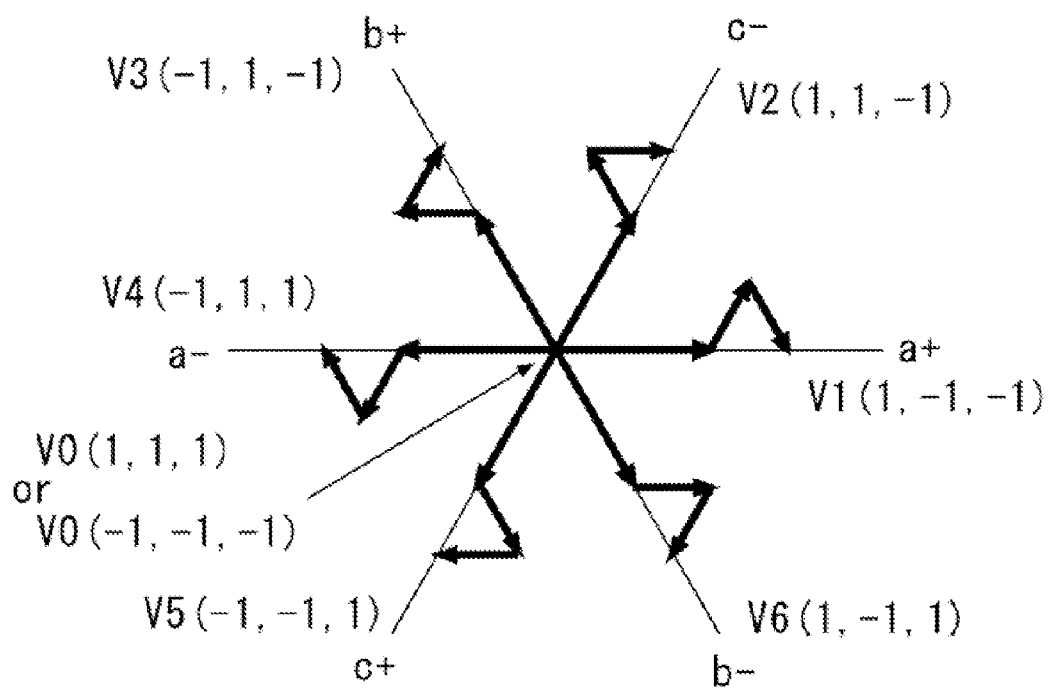
FIG. 25 shows voltage vectors according to a preferred embodiment of the present invention.
Figure 26:
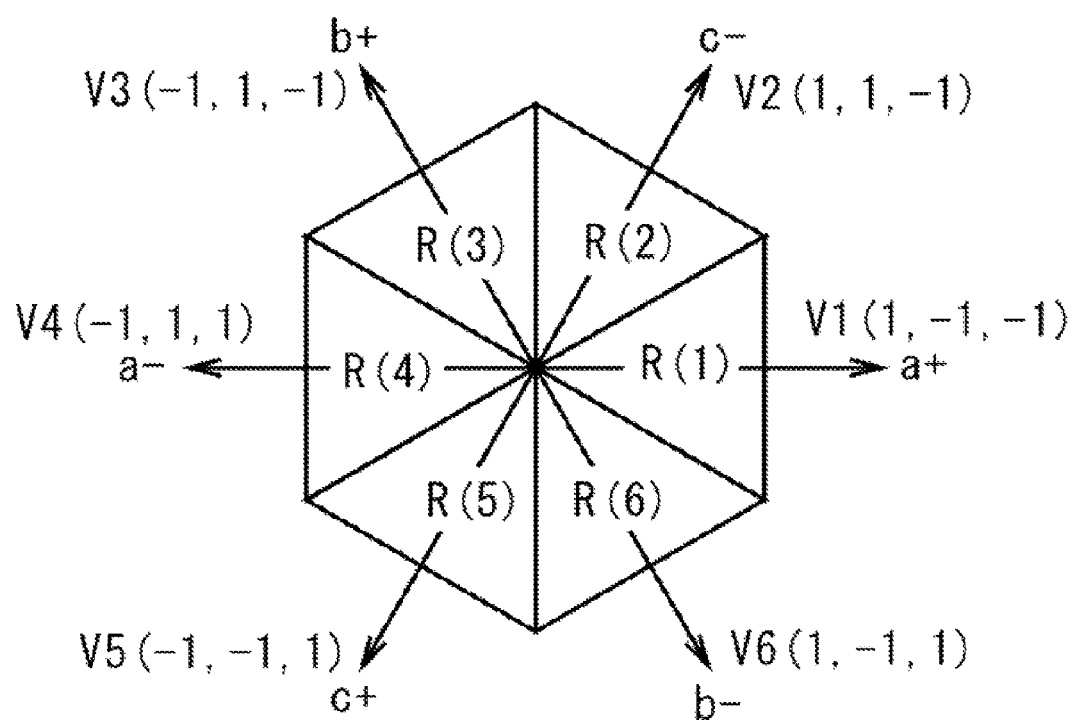
FIG. 26 shows a relationship between a flux phase angle and K according to a preferred embodiment of the present invention.

FIG. 24 is a schematic diagram showing connections of coils 922 in the same manner as FIG. 6. Blocks with La, Lb, Lc represent coils of each phase, and FIG. 24 shows connecting relationships between coil groups La, Lb, Lc and wires A, B, C drawn from the inverter 11. FIG. 25 shows voltage vectors V1, V2, . . . , V6 and V0 where positive or negative voltage is applied to each of wires A, B and C. In the case of star-connection, as shown in FIG. 25, moving directions of the end point of the flux vector in accordance with the voltage vectors are (a+), (c−), (b+), (a−), (c+), (b−), respectively. The relationship between changing of torque T and flux φ and n is the same as shown in Table 1. The relationship between the flux phase angle θp and K for determining n is shown in FIG. 26.

As mentioned above, in the case where the winding 923 is star-connected in the SRM 9, in the same manner as the case of delta-connection except for the relationship between the flux phase angle θp and the switching patterns, the SRM 9 is capable of being controlled under DTC.

Various modifications to the preferred embodiments discussed above are possible and can be adopted. Appropriate modifications of details of DTC are allowed. For example, the torque hysteresis comparator 141 can output a binary value. The shape of the flux trajectory changes variously in accordance with control conditions.

Preferably, the inverter 11 in the above described preferred embodiments is utilized in the motor controller 1; however, an inverter having a different configuration can be utilized. The structure realizing feedback control can be different from the above-described preferred embodiments of the present invention.

The flux limit and the current limit may be determined based on motor type or other conditions other than reference torque or rotating speed.

Preferred embodiments of the present invention can be applied to switched reluctance motors for various uses.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A motor controller configured to control a switched reluctance motor comprising:
an inverter connected to the switched reluctance motor;
a torque and flux calculator configured to estimate or measure torque and flux generated in the switched reluctance motor as calculated torque and calculated flux, based on an output from the inverter and a rotor angle of the switched reluctance motor;

a switching pattern selector configured to input a signal to the inverter to select one of a plurality of switching patterns based on a comparison result of a reference torque and the calculated torque, a comparison result of a reference flux and the calculated flux, and a flux phase angle; and a reference flux calculator configured to compare a highest phase flux out of three phase fluxes obtained by the torque and flux calculator with a flux limit and reduce the reference flux when the highest phase flux is higher than the flux limit.

2. The motor controller according to claim 1, wherein the reference flux calculator is configured to change the flux limit based on at least one of the reference torque and a rotating speed.

3. The motor controller according to claim 2, wherein the reference flux calculator is configured to compare a highest phase current out of three phase currents outputted from the inverter with a current limit and to reduce the reference flux when the highest phase current is higher than the flux limit.

4. The motor controller according to claim 3, wherein the inverter is a three-phase bridge inverter including six switching elements.

5. The motor controller according to claim 4, wherein the reference flux calculator is configured to obtain the reference flux by subtracting a value calculated using a comparison result from a predetermined initial reference flux.

6. The motor controller according to claim 3, wherein the reference flux calculator is configured to obtain the reference flux by subtracting a value calculated using a comparison result from a predetermined initial reference flux.

7. The motor controller according to claim 2, wherein the inverter is a three-phase bridge inverter including six switching elements.

8. The motor controller according to claim 7, wherein the reference flux calculator is configured to obtain the reference flux by subtracting a value calculated using a comparison result from a predetermined initial reference flux.

9. The motor controller according to claim 2, wherein the reference flux calculator is configured to obtain the reference flux by subtracting a value calculated using a comparison result from a predetermined initial reference flux.

10. The motor controller according to claim 1, wherein the reference flux calculator is configured to compare a highest phase current out of three phase currents outputted from the inverter with a current limit and to reduce the reference flux when the highest phase current is higher than the flux limit.

11. The motor controller according to claim 10, wherein the inverter is a three-phase bridge inverter including six switching elements.

12. The motor controller according to claim 11, wherein the reference flux calculator is configured to obtain the reference flux by subtracting a value calculated using a comparison result from a predetermined initial reference flux.

13. The motor controller according to claim 10, wherein the reference flux calculator is configured to obtain the reference flux by subtracting a value calculated using a comparison result from a predetermined initial reference flux.

14. The motor controller according to claim 1, wherein the inverter is a three-phase bridge inverter including six switching elements.

15. The motor controller according to claim 14, wherein the reference flux calculator is configured to obtain the reference flux by subtracting a value calculated using a comparison result from a predetermined initial reference flux.

16. The motor controller according to claim 1, wherein the reference flux calculator is configured to obtain the reference flux by subtracting a value calculated using a comparison result from a predetermined initial reference flux.

17. A motor controller configured to control a switched reluctance motor comprising:

an inverter connected to the switched reluctance motor;

a torque and flux calculator configured to estimate or measure a torque and a flux generated in the switched reluctance motor as calculated torque and calculated flux, based on an output from the inverter and a rotor angle of the switched reluctance motor;

a switching pattern selector configured to input a signal to the inverter to select one of a plurality of switching patterns based on a comparison result of a reference torque and the calculated torque, a comparison result of a reference flux and the calculated flux, and a flux phase angle; and a reference flux calculator configured to compare a highest phase current out of three phase currents outputted from the inverter with a current limit and reduce the reference flux when the highest phase current is higher than the current limit.

18. The motor controller according to claim 17, wherein the reference flux calculator is configured to change the current limit based on at least one of the reference torque and a rotating speed.

19. The motor controller according to claim 18, wherein the reference flux calculator is configured to obtain the reference flux by subtracting a value calculated using a comparison result from a predetermined initial reference flux.

20. The motor controller according to claim 17, wherein the inverter is a three-phase bridge inverter including six switching elements.

21. The motor controller according to claim 20, wherein the reference flux calculator is configured to obtain the reference flux by subtracting a value calculated using a comparison result from a predetermined initial reference flux.

22. The motor controller according to claim 17, wherein the reference flux calculator is configured to obtain the reference flux by subtracting a value calculated using a comparison result from a predetermined initial reference flux.

* * * * *